US012631494B2

(12) United States Patent
Kosaka

(10) Patent No.: US 12,631,494 B2
(45) Date of Patent: May 19, 2026

(54) BOLOMETER AND BOLOMETER MANUFACTURING METHOD

(71) Applicant: NEC Corporation, Tokyo (JP)

(72) Inventor: Mayumi Kosaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 229 days.

(21) Appl. No.: 18/632,519

(22) Filed: Apr. 11, 2024

(65) Prior Publication Data

US 2024/0361184 A1 Oct. 31, 2024

(30) Foreign Application Priority Data

Apr. 28, 2023 (JP) ................................. 2023-075033

(51) Int. Cl.
G01J 5/20 (2006.01)
B82Y 30/00 (2011.01)

(52) U.S. Cl.
CPC ................. G01J 5/20 (2013.01); B82Y 30/00 (2013.01)

(58) Field of Classification Search
CPC ................................... B82Y 30/00; G01J 5/20
See application file for complete search history.

(56) References Cited

U.S. PATENT DOCUMENTS 3,629,585 A * 12/1971 Desvignes ................ G01J 5/20
250/353
5,966,590 A * 10/1999 Wada ........................ G01J 5/20
438/54

6,307,194 B1 * 10/2001 Fitzgibbons .............. G01J 5/20
250/238
6,346,703 B1 * 2/2002 Lee ........................... G01J 5/24
250/338.1
6,437,331 B1 * 8/2002 Kawano .................... G01J 5/20
250/338.3
6,507,021 B1 * 1/2003 Brood ....................... G01J 5/20
250/338.1
2010/0148067 A1 * 6/2010 Cheon ...................... G01J 5/024
216/13
2011/0049366 A1 * 3/2011 Yang ......................... G01J 5/04
257/E31.093
2011/0168894 A1 * 7/2011 Bratkovski ........ G02B 19/0019
977/932
2011/0241154 A1 * 10/2011 Suzuki .................. H10F 39/184
257/467

(Continued)

FOREIGN PATENT DOCUMENTS

WO 2020/235636 A1 11/2020

*Primary Examiner* — Blake C Riddick
(74) *Attorney, Agent, or Firm* — Sughrue Mion, PLLC

(57) ABSTRACT

A bolometer includes a first electrode including a plurality of first extending portions having a plurality of first inner surfaces arranged in an arrangement direction, each of the first inner surfaces extending in an extension direction intersecting the arrangement direction, a second electrode facing the first electrode while being separated from the first electrode in the extension direction, and a sensor including a sensor film and a connection portion, in which the first electrode, the sensor film, and the second electrode are arranged in order in the extension direction, the connection portion extends in the extension direction, is provided between the plurality of first inner surfaces, and electrically connects the plurality of first inner surfaces and the sensor film, and the sensor includes carbon nanotubes.

16 Claims, 22 Drawing Sheets

(56)         References Cited

U.S. PATENT DOCUMENTS

| | | | |
|---|---|---|---|
| 2011/0254959 A1* | 10/2011 | Seppa ........................ | G01J 5/20 |
| | | | 250/338.3 |
| 2012/0132804 A1* | 5/2012 | Lee .......................... | G01J 5/046 |
| | | | 257/E31.093 |
| 2014/0105242 A1* | 4/2014 | Fernandes ................. | G01J 5/20 |
| | | | 374/185 |
| 2019/0178718 A1* | 6/2019 | Kawasaki ................. | G01J 5/06 |
| 2022/0034720 A1* | 2/2022 | Tanaka ................. | G01J 5/0853 |
| 2022/0034721 A1* | 2/2022 | Tanaka .................. | G01J 5/046 |
| 2022/0221346 A1* | 7/2022 | Yuge ..................... | C01B 32/174 |
| 2022/0333994 A1* | 10/2022 | Tanaka ...................... | G01J 5/20 |
| 2023/0032022 A1* | 2/2023 | Klimov .................... | G01J 5/20 |
| 2023/0288262 A1* | 9/2023 | Yuge ....................... | H10F 30/10 |
| 2023/0384165 A1* | 11/2023 | Tanaka ...................... | G01J 5/20 |
| 2024/0011841 A1* | 1/2024 | Kosaka ..................... | G01J 5/20 |
| 2024/0210247 A1* | 6/2024 | Tanaka ...................... | G01J 5/20 |
| 2024/0276863 A1* | 8/2024 | Tanaka ................... | H10K 30/81 |
| 2024/0349610 A1* | 10/2024 | Tanaka ................... | H10N 15/15 |

* cited by examiner

ELECTRODE

| WIDTH OF GROOVE (μm) | LENGTH OF ELECTRODE CIRCUMFERENCE (μm) | RESISTANCE VALUE (Ω)@3V |
|---|---|---|
| NONE | 810 | $1.4 \times 10^8$ |
| 10 | 1450 | $1.6 \times 10^7$ |
| 5 | 2090 | $1.4 \times 10^6$ |
| 2 | 4010 | $7.5 \times 10^5$ |

BOLOMETER AND BOLOMETER MANUFACTURING METHOD

CROSS-REFERENCE TO RELATED APPLICATION

Priority is claimed on Japanese Patent Application No. 2023-075033, filed Apr. 28, 2023, the content of which is incorporated herein by reference.

TECHNICAL FIELD

The present disclosure relates to a bolometer and a bolometer manufacturing method.

BACKGROUND ART

It is widely known that bolometers are used to detect infrared rays.

For example, PCT International Publication No. WO2020/235636 (hereinafter Patent Document 1) discloses a bolometer that includes an electrode and a carbon nanotube layer electrically connected to the electrode.

SUMMARY

In Patent Document 1, an electrode is formed to be superimposed on a carbon nanotube layer, and thus the electrode and the carbon nanotube layer are connected.

However, in a configuration of the bolometer disclosed in Patent Document 1, the carbon nanotube layer may be connected to only a portion of the electrode.

For this reason, a contact resistance between the carbon nanotube layer and the electrode may increase, and detection sensitivity may decrease.

An example object of the present disclosure is to provide a bolometer and a bolometer manufacturing method for solving the above-described problem.

A bolometer according to an example aspect of the present disclosure includes a first electrode including a plurality of first extending portions having a plurality of first inner surfaces arranged in an arrangement direction, each of the first inner surfaces extending in an extension direction intersecting the arrangement direction, a second electrode facing the first electrode while being separated from the first electrode in the extension direction, and a sensor including a sensor film and a connection portion, in which the first electrode, the sensor film, and the second electrode are arranged in order in the extension direction, the connection portion extends in the extension direction, is provided between the plurality of first inner surfaces, and electrically connects the plurality of first inner surfaces and the sensor film, and the sensor includes carbon nanotubes.

A bolometer manufacturing method according to an example aspect of the present disclosure includes forming a first electrode and a second electrode, the first electrode including a plurality of first extending portions having a plurality of first inner surfaces arranged in an arrangement direction, the each of first inner surfaces extending in an extension direction intersecting the arrangement direction, the second electrode facing the first electrode while being separated from the first electrode in the extension direction, and forming a sensor including a sensor film and a connection portion, in which the first electrode, the sensor film, and the second electrode are arranged in order in the extension direction, the connection portion extends in the extension direction, is provided between the plurality of first inner surfaces, and electrically connects the plurality of first inner surfaces and the sensor film, and the sensor includes carbon nanotubes.

According to the above aspect, decrease in detection sensitivity can be suppressed.

BRIEF DESCRIPTION OF THE DRAWINGS

FIG. 4 is a cross-sectional view taken along a line IV-IV in FIG. 1.

FIG. 10 is a cross-sectional view of a bolometer according to a first modification example of some example embodiments of the present disclosure.

FIG. 15 is a cross-sectional view of a cut portion taken along a line XV-XV in

FIG. 14.

FIG. 24 is a plan view of an electrode according to an example of the present disclosure.

EXAMPLE EMBODIMENT

Hereinafter, various example embodiments according to the present disclosure will be described using the drawings.

Hereinafter, some example embodiments according to the present disclosure will be described using FIGS. 1 to 19.
(Configuration of Bolometer)

Figure 1:
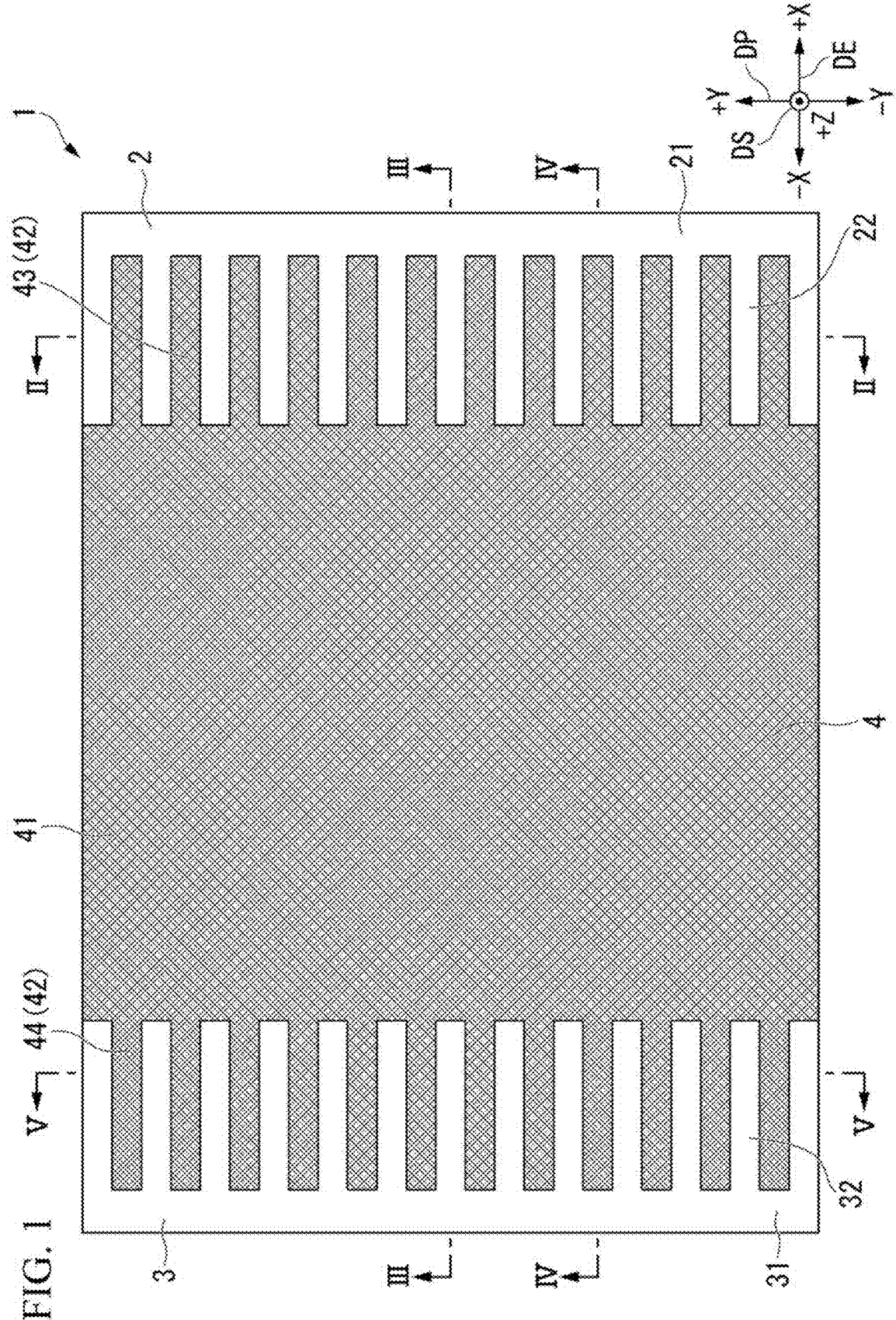
FIG. 1 is a plan view of a bolometer according to some example embodiments of the present disclosure.

As shown in FIG. 1, a bolometer 1 includes a first electrode 2, a second electrode 3, and a sensor unit 4.

As shown in FIGS. 2 to 5, the bolometer 1 further includes a substrate 5 and an insulating layer 6.

The bolometer 1 is used, for example, in a non-cooling type infrared sensor.

The substrate 5 is, for example, a silicon substrate.

The insulating layer 6 is, for example, a silicon dioxide layer.

The insulating layer 6 is stacked on the substrate 5.

The first electrode 2, the second electrode 3, and the sensor unit 4 are stacked on the insulating layer 6.
(Configuration of First Electrode)

The first electrode 2 includes a first base portion 21 and a plurality of first extending portions 22.

The first electrode 2 has a comb shape, as a whole, in which comb teeth being the plurality of first extending portions 22 extend in a −X direction from a long side of a rectangular region, which is the first substrate 21, on a −X side in a plan view when viewed in a −Z direction.

An interval between the plurality of first extending portions 22 is smaller than an interval between the first electrode 2 and the second electrode 3 shown below.

For example, an interval between the plurality of first extending portions 22 is 20 μm or less, and an interval between the first electrode 2 and the second electrode 3 is greater than 20 μm.

Each of the first base portion 21 and the plurality of first extending portions 22 has a layered structure which is stacked on the insulating layer 6 and is configured such that a titanium layer 2Ti and a gold layer 2Au are stacked in order from the insulating layer 6.

The first base portion 21 extends in an arrangement direction DP at one end (one end on the +X direction side) of both ends of the bolometer 1 in an extension direction DE.

Each of the first extending portions 22 extends from the first base portion 21 toward the second electrode 3 in the extension direction DE.

For example, the plurality of first extending portions 22 corresponding to the comb-shaped comb teeth of the first electrode 2 may extend parallel to the direction of a current flowing between the first electrode 2 and the second electrode 3.

Figure 2:
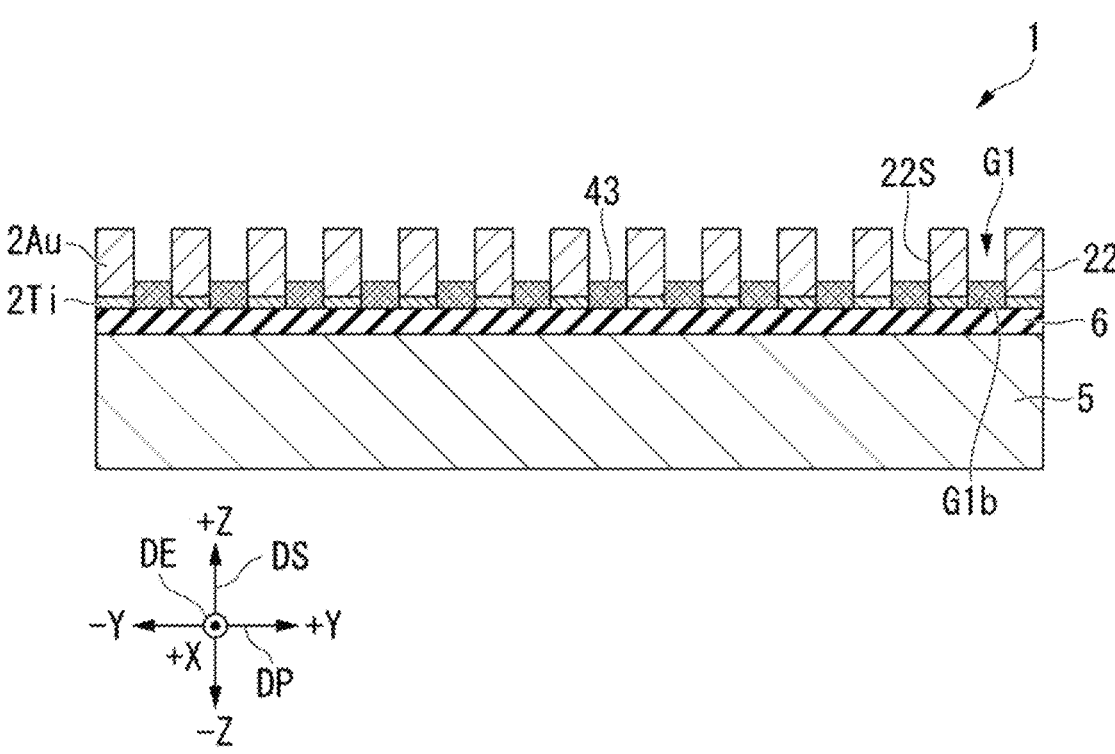
FIG. 2 is a cross-sectional view of a cut portion taken along a line II-II in FIG. 1.
Figure 4:
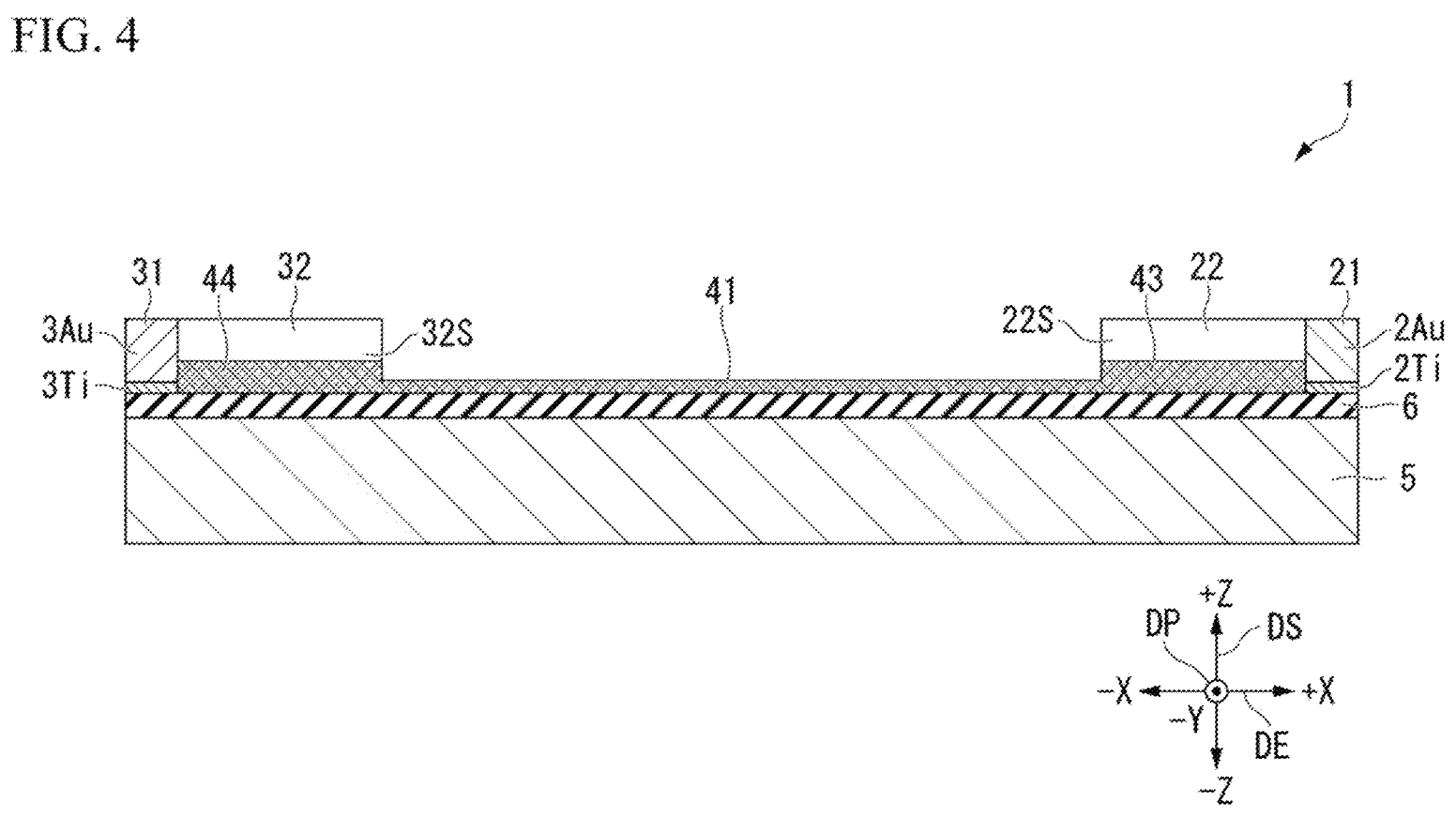

As shown in FIGS. 2 and 4, the plurality of first extending portions 22 have a plurality of first inner surfaces 22S arranged in the arrangement direction DP.

Each of the first inner surfaces 22S extends from the first base portion 21 toward the second electrode 3 in the extension direction DE.

One of the first inner surfaces 22S of each of the first extending portions 22 faces one of the first inner surfaces 22S of the adjacent first extending portions 22 with a first groove G1 therebetween. Thereby, the first grooves G1 extend in the extension direction DE and are recessed between the plurality of first extending portions 22 in a stacking direction DS.

In the present example embodiments, the extension direction DE intersects the arrangement direction DP.

Further, one direction of the extension direction DE is also referred to as a +X direction, and the other direction of the extension direction DE is also referred to as a −X direction. Further, one direction of the arrangement direction DP is also referred to as a +Y direction, and the other direction of the arrangement direction DP is also referred to as a −Y direction. Further, one direction of the stacking direction DS is also referred to as a +Z direction, and the other direction of the stacking direction DS is also referred to as a −Z direction.

For example, the extension direction DE, the arrangement direction DP, and the stacking direction DS may be orthogonal to each other.
(Configuration of Second Electrode)

The second electrode 3 faces the first electrode 2 while being separated from the first electrode 2 in the extension direction DE.

The second electrode 3 includes a second base portion 31 and a plurality of second extending portions 32.

The second electrode 3 has a comb shape in which comb teeth being the plurality of second extending portions 32 extend in the +X direction from a long side of a rectangular region, which is the second base portion 31 as a whole, on the +X side in a plan view when looking toward the −Z direction.

An interval between the plurality of second extending portions 32 is smaller than an interval between the first electrode 2 and the second electrode 3 shown below.

For example, an interval between the plurality of second extending portions 32 is 20 μm or less, and an interval between the first electrode 2 and the second electrode 3 is greater than 20 μm.

An interval between the first electrode 2 and the second electrode 3 is a distance between an end of the first electrode 2 which is closest to the −X side and an end of the second electrode 3 which is closest to the +X side in the extension direction DE. In particular, in the case of the present example embodiments, an interval between the first electrode 2 and the second electrode 3 is a distance between the forefront end of the plurality of first extending portions 22 on the −X side and the forefront end of the plurality of second extending portions 32 on the +X side in the extension direction DE.

Each of the second base portion 31 and the plurality of second extending portions 32 has a layered structure which is stacked on the insulating layer 6 and is configured such that a titanium layer 3Ti and a gold layer 3Au are stacked in order from the insulating layer 6.

The second base portion 31 extends in the arrangement direction DP at the other end (one end on the +X direction side) of both ends of the bolometer 1 in the extension direction DE.

Each of the second extending portions 32 extends from the second base portion 31 toward the first electrode 2 in the extension direction DE.

For example, the plurality of second extending portions 32 corresponding to the comb-shaped comb teeth of the second electrode 3 may extend parallel to the direction of a current flowing between the first electrode 2 and the second electrode 3.

Figure 5:
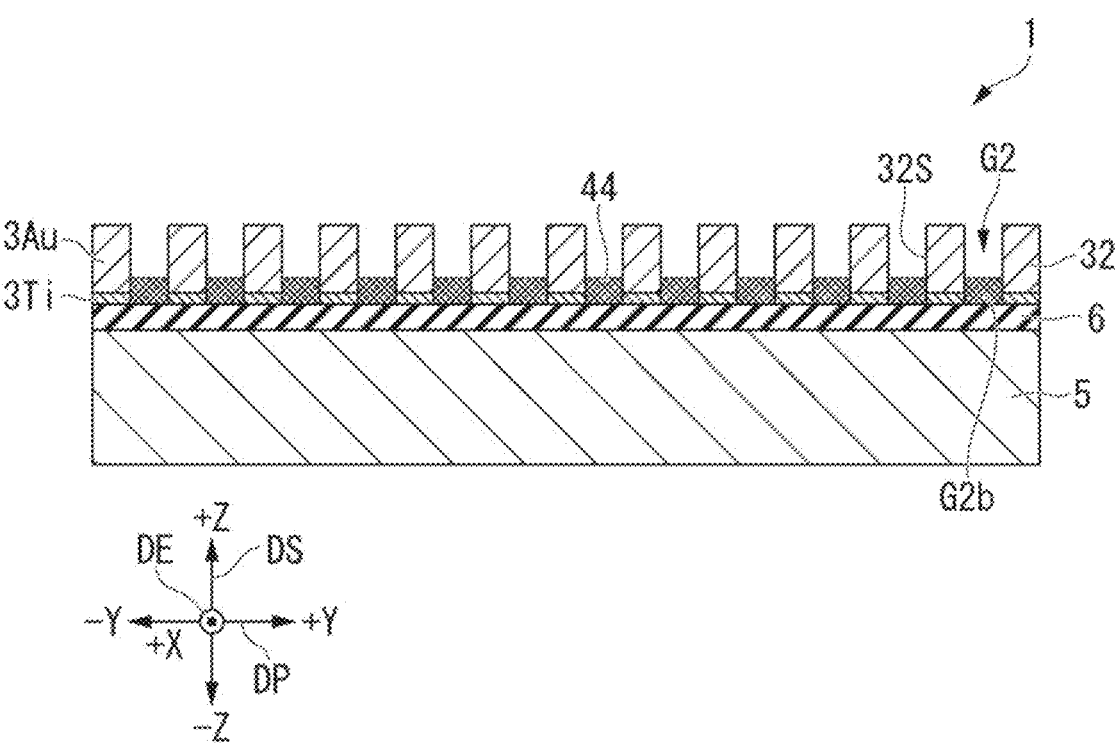
FIG. 5 is a cross-sectional view of a cut portion taken along a line V-V in FIG. 1.

As shown in FIGS. 4 and 5, the plurality of second extending portions 32 have a plurality of second inner surfaces 32S arranged in the arrangement direction DP.

Each of the second inner surfaces 32S extend from the second base portion 31 toward the first electrode 2 in the extension direction DE.

One of the second inner surfaces 32S of each of the second extending portions 32 faces one of the second inner surfaces 32S of the adjacent second extending portions 32 with a second groove G2 therebetween. Thereby, the second grooves G2 extend in the extension direction DE and are recessed between the plurality of second extending portions 32 in the stacking direction DS.

(Configuration of Sensor Unit)

The sensor unit 4 detects a change in temperature due to infrared rays absorbed by the bolometer 1 as a change in an electrical resistance value.

For example, the sensor unit 4 may detect a change in temperature due to infrared rays absorbed by the sensor unit 4 as a change in an electrical resistance value.

The sensor unit 4 includes a sensor film 41 and a connection portion 42.

The thickness of the connection portion 42 is greater than the thickness of the sensor film 41.

The sensor film 41 includes semiconductor-type carbon nanotubes as carbon nanotubes.

The sensor film 41 is a film that extends to a region between the first electrode 2 and the second electrode 3.

The sensor film 41 has a rectangular shape in which one side thereof extends in the extension direction DE and the other side thereof extends in the arrangement direction DP in a plan view when viewed in the −Z direction.

The sensor film 41 and the connection portion 42 are electrically connected and formed integrally.

The first electrode 2, the sensor film 41, and the second electrode 3 are arranged in order in the extension direction DE.

Figure 3:
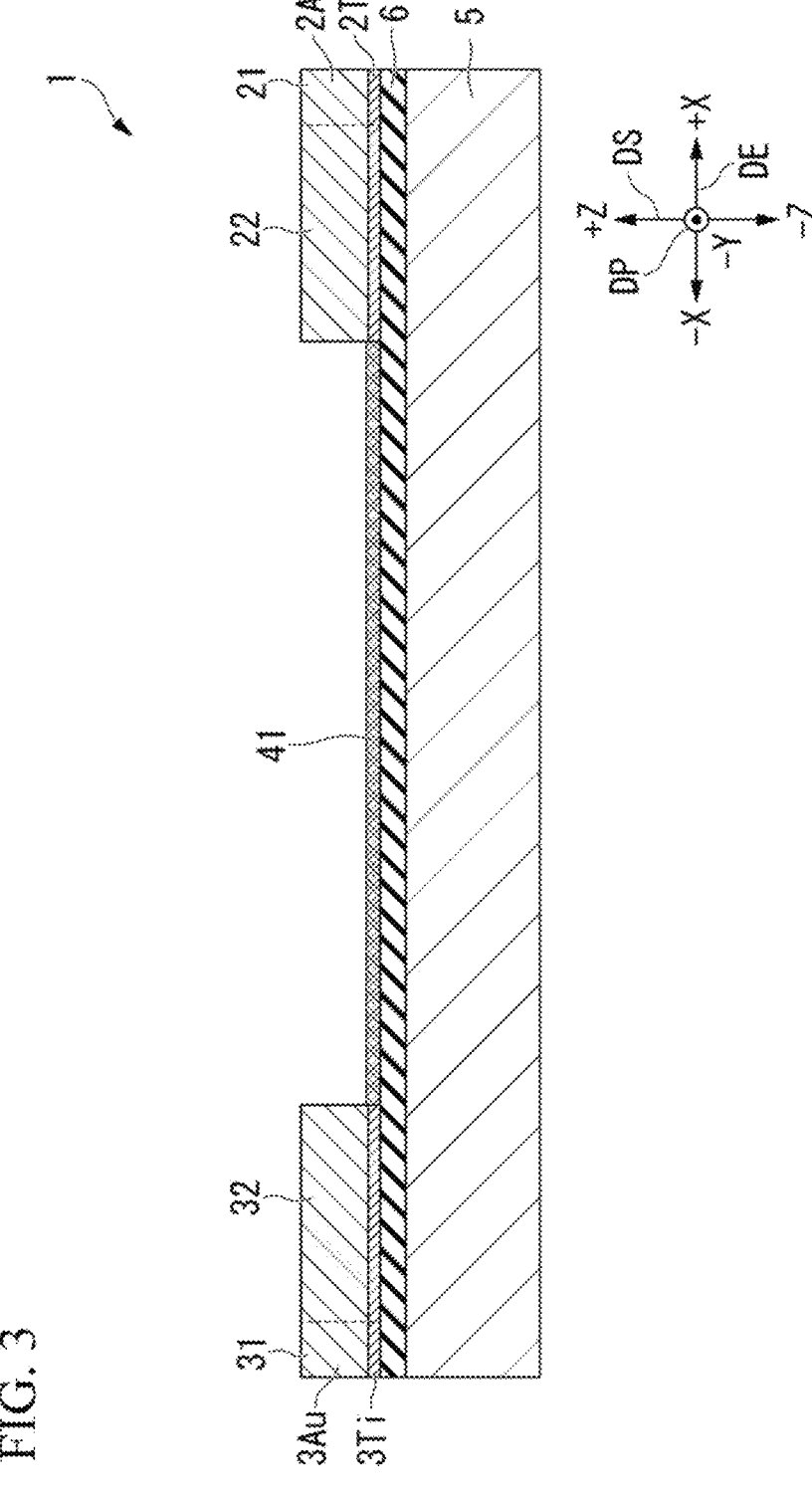
FIG. 3 is a cross-sectional view taken along a line III-III in FIG. 1.

As shown in FIGS. 3 and 4, the sensor film 41 is a layer that comes into contact with the insulating layer 6, and is directly stacked on the insulating layer 6.

Figure 6:
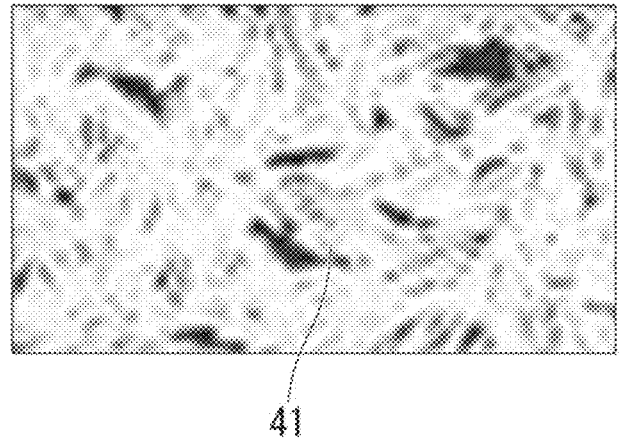
FIG. 6 is a diagram showing an example of a scanning electron microscope image of a sensor film according to some example embodiments of the present disclosure.

The sensor film 41 is a carbon nanotube network film in which a plurality of carbon nanotubes are randomly oriented and form a network with each other, as shown in FIG. 6.

For example, the carbon nanotubes are single-walled carbon nanotubes.

For example, the thickness of the sensor film 41 is greater than or equal to 1 nm and less than or equal to 10 nm.

The connection portion 42 includes a plurality of first connection patterns 43 and a plurality of second connection patterns 44.

For example, the first connection patterns 43 and the second connection patterns 44 may have a thickness of 1 nm or more and 10 nm or less. At this time, each of the first connection patterns 43 and each of the second connection patterns 44 are larger than the thickness of the sensor film 41.

As shown in FIG. 4, the first connection patterns 43 and the second connection patterns 44 are layers that come into contact with the insulating layer 6 following the sensor film

41, and are directly stacked on the insulating layer 6 similarly to the sensor film 41.

Each of the first connection patterns 43 extends between the related first inner surfaces 22S in the extension direction DE. Specifically, each of the first connection patterns 43 extends in the +X direction along bottoms G1*b* of the related first grooves G1 from one end (one end on the +X direction side) on the first base portion 21 side out of both ends of the sensor film 41 in the extension direction DE toward the first base portion 21.

Each of the first connection patterns 43 is in contact with the plurality of first inner surfaces 22S to electrically connect the plurality of first inner surfaces 22S and the sensor film 41.

Each of the first connection patterns 43 includes semiconductor-type carbon nanotubes as carbon nanotubes.

Similarly, each of the second connection patterns 44 extends between the related second inner surfaces 32S in the extension direction DE. Specifically, each of the second connection patterns 44 extends in the −X direction along bottoms G2*b* of the related second grooves G2 from the other end (one end on the −X direction side) on the second base portion 31 side out of both ends of the sensor film 41 in the extension direction DE toward the second base portion 31.

Each of the second connection patterns 44 is in contact with the plurality of second inner surfaces 32S to electrically connect the plurality of second inner surfaces 32S and the sensor film 41.

Each of the second connection patterns 44 includes semiconductor-type carbon nanotubes as carbon nanotubes.

Figure 7:
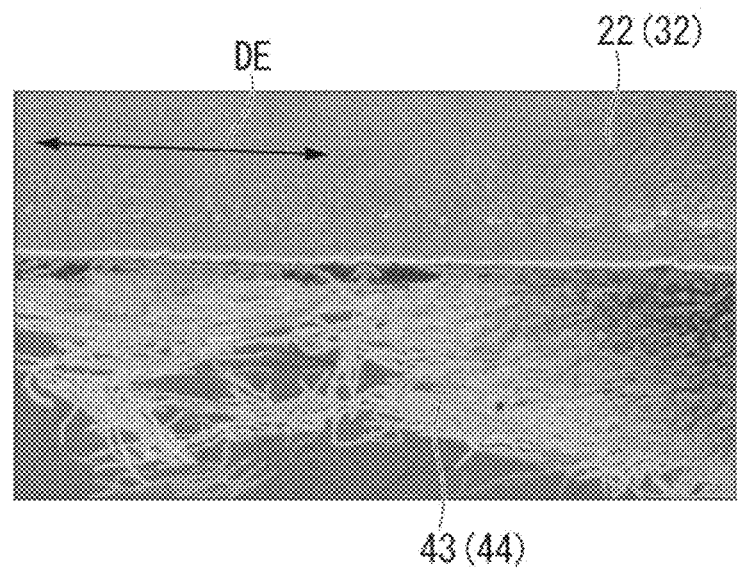
FIG. 7 is a diagram showing an example of a scanning electron microscope image of a connection portion according to some example embodiments of the present disclosure.

In each of the plurality of first connection patterns 43 and the plurality of second connection patterns 44, carbon nanotubes may be a carbon nanotube network film in which a plurality of carbon nanotubes are randomly oriented and form a network with each other as shown in FIG. 6, but may be oriented in the extension direction DE or may be bundled to be arranged in the extension direction DE as shown in FIG. 7. In terms of the effects of the present disclosure, it is preferable that carbon nanotubes be oriented in the extension direction DE or be bundled to be arranged in the extension direction DE.

(Bolometer Manufacturing Method)

A method of manufacturing the bolometer 1 of the present example embodiments will be described.

Figure 8:
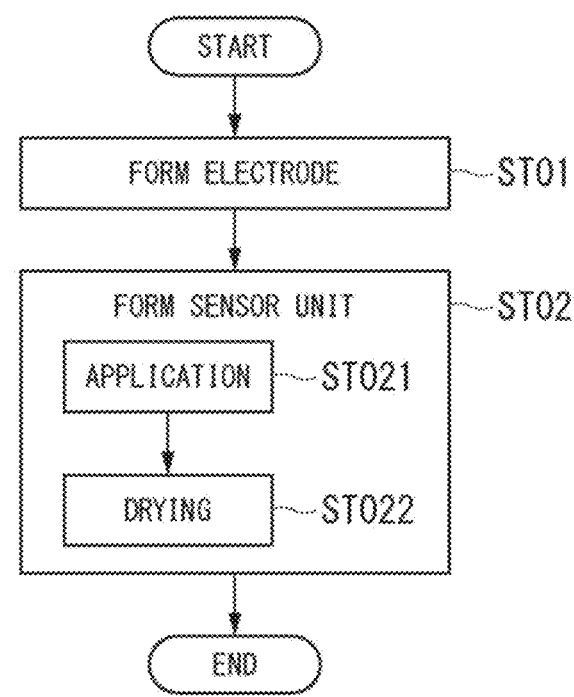
FIG. 8 is a flowchart showing a bolometer manufacturing method according to some example embodiments of the present disclosure.

As shown in FIG. 8, first, an operator forms the first electrode 2 and the second electrode 3 on the insulating layer 6 stacked on the substrate 5 (ST01: Electrode forming step).

For example, in ST01, the operator sequentially forms titanium and gold films by sputtering or the like and patterns a layered structure formed by etching or the like to form the first electrode 2 and the second electrode 3.

Subsequently to the execution of ST01, the operator forms the sensor unit 4 on the insulating layer 6 (ST02: Sensor unit forming step).

For example, in ST02, the operator applies a dispersion liquid containing semiconductor-type carbon nanotubes dispersed therein as carbon nanotubes onto the surface of the insulating layer 6 exposed between the first electrode 2 and the second electrode 3 and the surface of the insulating layer 6 exposed by the first grooves G1 and the second grooves G2 (ST021: Application step), and dries the applied dispersion liquid (ST022: Drying step).

Thereby, not only the sensor film 41 is formed between the first electrode 2 and the second electrode 3, but also the plurality of first connection patterns 43 and the plurality of second connection patterns 44 are formed in the first grooves G1 and the second grooves G2.

In narrow regions of the first grooves G1 and the second grooves G2, the applied dispersion liquid tends to be collected, and thus the thickness of each of the first connection patterns 43 and each of the second connection patterns 44 tend to be larger than the thickness of the sensor unit 41 in the sensor unit 4 formed by ST02.

The carbon nanotubes arranged when performing ST02 are arranged in the first grooves G1 and the second grooves G2 which are narrow areas defined by perpendicular walls.

Here, in the vicinity of perpendicular walls such as the plurality of first inner surfaces 22S and the plurality of second inner surfaces 32S, carbon nanotubes arranged by applying and drying the dispersion liquid tend to be arranged along the walls.

For this reason, the carbon nanotubes included in the plurality of first connection patterns 43 and the plurality of second connection patterns 44 are easily oriented in the extension direction DE or tend to be bundled to be arranged in the extension direction DE.

(Operations of Bolometer)

Operations of the bolometer 1 of the present example embodiments will be described.

When infrared rays are incident on and absorbed by the bolometer 1, heat is generated. For example, when the sensor unit 4 absorbs the infrared rays, heat is generated in the sensor unit 4.

The sensor unit 4 is warmed by the generated heat, and an electrical resistance value of the sensor unit 4 changes.

Figure 9:
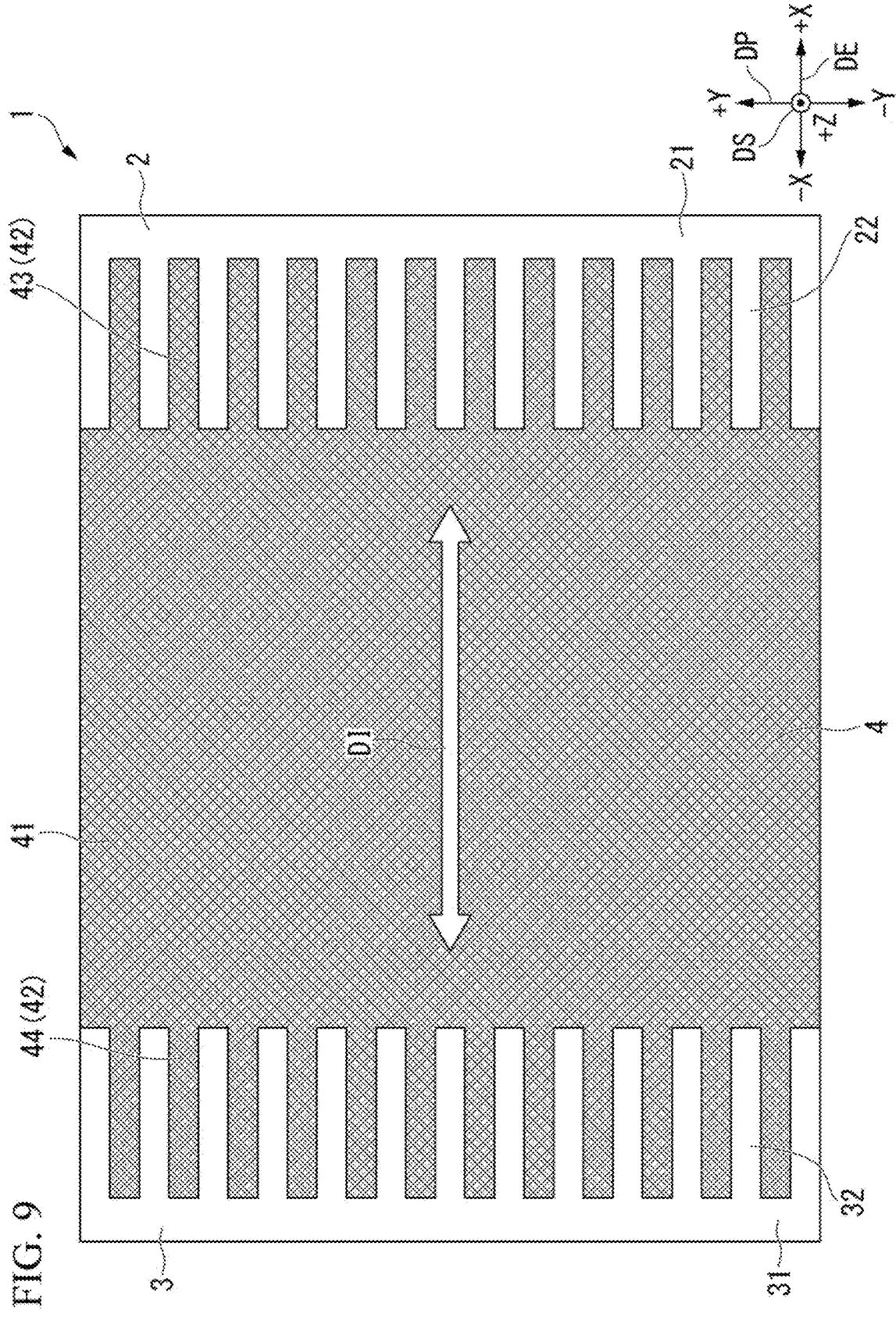
FIG. 9 is a plan view for describing an operation of the bolometer according to some example embodiments of the present disclosure.

The bolometer 1 applies a current between the first electrode 2 and the second electrode 3 in a current direction DI as shown in FIG. 9 to electrically detect a change in the electrical resistance value of the sensor unit 4 and detect infrared rays.

(Actions and Effects)

In the bolometer 1 of the present example embodiments, the sensor unit 4 extends in the extension direction DE between the plurality of first inner surfaces 22S.

According to such a configuration, the connection portion 42 extends in the extension direction DE between the plurality of first inner surfaces 22S, and thus a contact area between the sensor unit 4 and the first electrode 2 increases.

In addition, according to such a configuration, the axes of the carbon nanotubes included in the sensor unit 4 tend to be oriented in the extension direction DE between the plurality of first inner surfaces 22S. Thereby, a contact area between a peripheral wall of the carbon nanotube included in the sensor unit 4 and the plurality of first inner surfaces 22S increases.

For this reason, a contact resistance between the sensor unit 4 and the first electrode 2 decreases, and a change in an electrical resistance value due to heat generated in the sensor unit 4 is easily detected.

Thus, according to the bolometer 1 of the present example embodiments, a decrease in detection sensitivity can be suppressed.

Similarly, in the bolometer 1 of the present example embodiments, the sensor unit 4 extends in the extension direction DE between the plurality of second inner surfaces 32S.

According to such a configuration, since the connection portion 42 extends in the extension direction DE between the plurality of second inner surfaces 32S, a contact area between the sensor unit 4 and the second electrode 3 increases.

In addition, according to such a configuration, the axes of the carbon nanotubes included in the sensor unit 4 tend to be oriented in the extension direction DE between the plurality of second inner surfaces 32S. Thereby, a contact area between a peripheral wall of the carbon nanotubes included in the sensor unit 4 and the plurality of second inner surfaces 32S increases.

For this reason, a contact resistance between the sensor unit 4 and the second electrode 3 decreases, and a change in an electrical resistance value due to heat in the sensor unit 4 is easily detected.

Thus, according to the bolometer 1 of the present example embodiments, a decrease in detection sensitivity can be suppressed.

In order to put a bolometer of a non-cooling type infrared sensor using carbon nanotubes into practical use, it is necessary not only to improve Temperature Coefficient of Resistance (TCR) but also to improve characteristics such as lower resistance. In order to reduce resistance, a problem is how carbon nanotubes are bonded to an electrode.

Here, the larger the TCR of the bolometer, the larger a change in resistance with respect to temperature. For this reason, the detection sensitivity of infrared rays is improved by increasing the TCR of the bolometer as an improvement in the TCR.

On the other hand, as the resistance of the bolometer decreases, it is easier to detect a change in resistance with respect to temperature. For this reason, the detection sensitivity of infrared rays is improved by a reduction in the resistance of the bolometer.

As a comparative example, a bolometer is examined in which a rectangular carbon nanotube film is formed between a pair of rectangular electrodes in a carbon nanotube film manufacturing process according to a drop-casting method using a dispersion liquid.

In the case of such a comparative example, a structure is adopted in which a carbon nanotube does not straddle each electrode, and only an end of a carbon nanotube between a pair of electrodes is electrically connected to a lower portion of an electrode wall of each electrode. In addition, the carbon nanotube film manufactured by the drop-casting method is formed by a substantially single carbon nanotube network layer with a large number of gaps, and thus carbon nanotubes are electrically connected only to a portion of a lower area of an electrode wall of each electrode. For this reason, it is difficult to reduce the resistance of the bolometer.

On the other hand, according to the present example embodiments, as described above, in addition to increasing a contact area between the sensor unit 4 and the second electrode 3, a contact area between the peripheral wall of the carbon nanotube included in the sensor unit 4 and the plurality of second inner surfaces 32S increases. For this reason, it is possible to reduce the resistance of the bolometer.

Thus, according to the bolometer 1 of the present example embodiments, it is possible to suppress a reduction in detection sensitivity as compared with the above-described comparative example.

As another comparative example, a bolometer is examined in which a carbon nanotube film is formed by the above-described drop casting method between a pair of electrodes each of which has a comb shape and which are not separated from each other in an extension direction but engage with each other through comb teeth.

In the case of the other comparative example, a direction in which the comb teeth extend intersects the direction of a current flowing between the comb teeth, and thus the orientation direction of the axes of the carbon nanotubes between the pair of electrodes intersects the direction of a current flowing between the comb teeth. In addition, when metal carbon nanotubes are arranged between the electrodes due to a decrease in a distance between the pair of electrodes, TCR is likely to be decreased.

On the other hand, according to the present example embodiments, since the second electrode 3 faces the first electrode 2 while being separated from the first electrode 2 in the extension direction DE, the axes of the carbon nanotubes are oriented in the direction of a flowing current between the plurality of first inner surfaces 22S and the plurality of second inner surfaces 32S. For this reason, it is possible to reduce the resistance of the bolometer.

In addition, since a distance between the first electrode 2 and the second electrode 3 is large, even when metal carbon nanotubes are arranged between the first electrode 2 and the second electrode 3, TCR is not likely to be decreased.

Thus, according to the bolometer 1 of the present example embodiments, it is possible to suppress a decrease in detection sensitivity as compared with the other comparative example described above.

In the bolometer 1 of the present example embodiments, for example, when the bottom surface of a groove is made of silicon dioxide and an electrode is a metal due to a groove structure between comb teeth of a comb-shaped electrode, carbon nanotubes can be oriented between the comb teeth in a direction in which the comb teeth extend as shown in FIG. 7. The carbon nanotubes are oriented in the direction in which the comb teeth extend, and thus a contact area between the carbon nanotubes and an electrode wall surface can be increased.

In the bolometer 1 of the present example embodiments, carbon nanotubes in the connection portion 42 are oriented in the extension direction DE or bundled to be arranged in the extension direction DE.

According to such a configuration, in the connection portion 42, the peripheral wall of the carbon nanotubes systematically faces the plurality of first inner surfaces 22S and the plurality of second inner surfaces 32S.

Thereby, contact areas between the connection portion 42, the plurality of first inner surfaces 22S and the plurality of second inner surfaces 32S increase.

In the bolometer 1 of the present example embodiments, the thickness of the connection portion 42 is greater than the thickness of the sensor film 41.

Thereby, contact areas between the connection portion 42, the plurality of first inner surfaces 22S and the plurality of second inner surfaces 32S increase.

In the bolometer 1 of the present example embodiments, an interval between the plurality of first extending portions 22 is smaller than an interval between the first electrode 2 and the second electrode 3.

Furthermore, in the bolometer 1 of the present example embodiments, an interval between the plurality of second extending portions 32 is smaller than an interval between the first electrode 2 and the second electrode 3.

Thereby, the axes of the carbon nanotubes included in the sensor unit 4 can tend to be oriented in the extension direction DE between the plurality of first extending portions 22 and between the plurality of second extending portions 32, while a large region can be provided between the first electrode 2 and the second electrode 3.

For this reason, the bolometer 1 can reduce a contact resistance between the sensor unit 4 and the first electrode 2 and a contact resistance between the sensor unit 4 and the second electrode 3, while the bolometer 1 can increase the detection sensitivity of the sensor film 41.

In the bolometer 1 of the present example embodiments, the sensor unit 4 includes semiconductor-type carbon nanotubes as carbon nanotubes.

Thereby, the TCR of the sensor unit 4 increases.

For this reason, the detection sensitivity of the sensor unit 4 can be increased.

First Modification Example

In the above-described example embodiments, the sensor unit 4 absorbs infrared rays, but when an electrical resistance value of the sensor unit 4 changes, infrared rays may be absorbed in any way in the bolometer.

Figure 10:
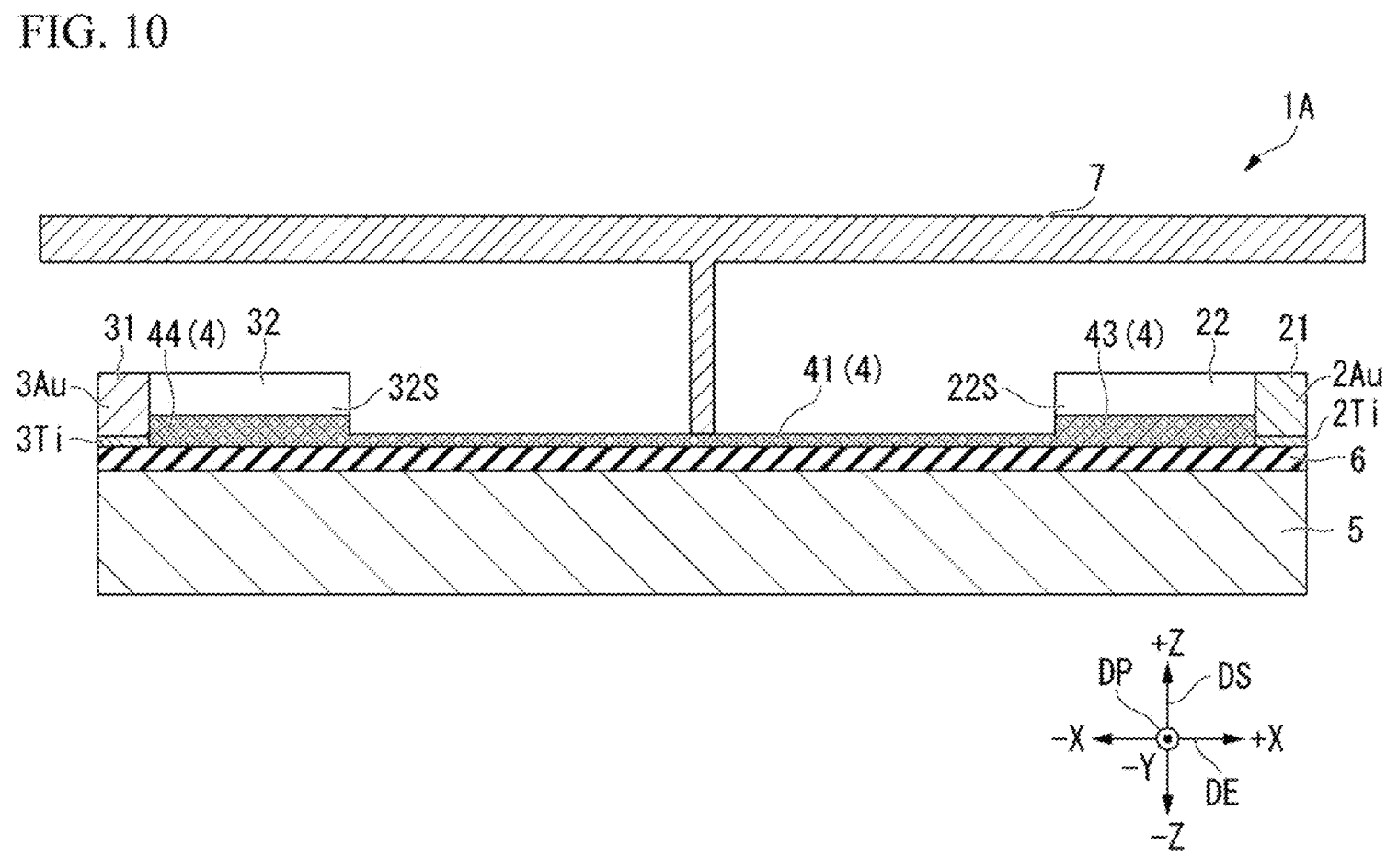

As a modification example, as shown in FIG. 10, a bolometer 1A may include an absorber 7 that covers the upper portion of the sensor unit 4, apart from the sensor unit 4. At this time, the sensor unit 4 may absorb infrared rays in the absorber 7 and detect a change in temperature due to heat generated in the absorber 7 as a change in the electrical resistance value in the sensor unit 4.

Second Modification Example

In the above-described example embodiments, the thickness of the connection portion 42 is larger than the thickness of the sensor film 41, but the connection portion 42 may be configured in any manner as long as the connection portion 42 electrically connects the plurality of first inner surfaces 22S and the plurality of second inner surfaces 32S to the sensor film 41.

As a modification example, the thickness of the connection portion 42 may be the same as or smaller than the thickness of the sensor film 41.

Third Modification Example

In the above-described example embodiments, the first electrode 2 includes the first base portion 21 and the plurality of first extending portions 22, and the second electrode 3 includes the second base portion 31 and the plurality of second extending portions 32. However, the second electrode 3 may be configured in any manner as long as the second electrode 3 faces the first electrode 2 while being separated from the first electrode 2 in the extension direction DE.

Figure 11:
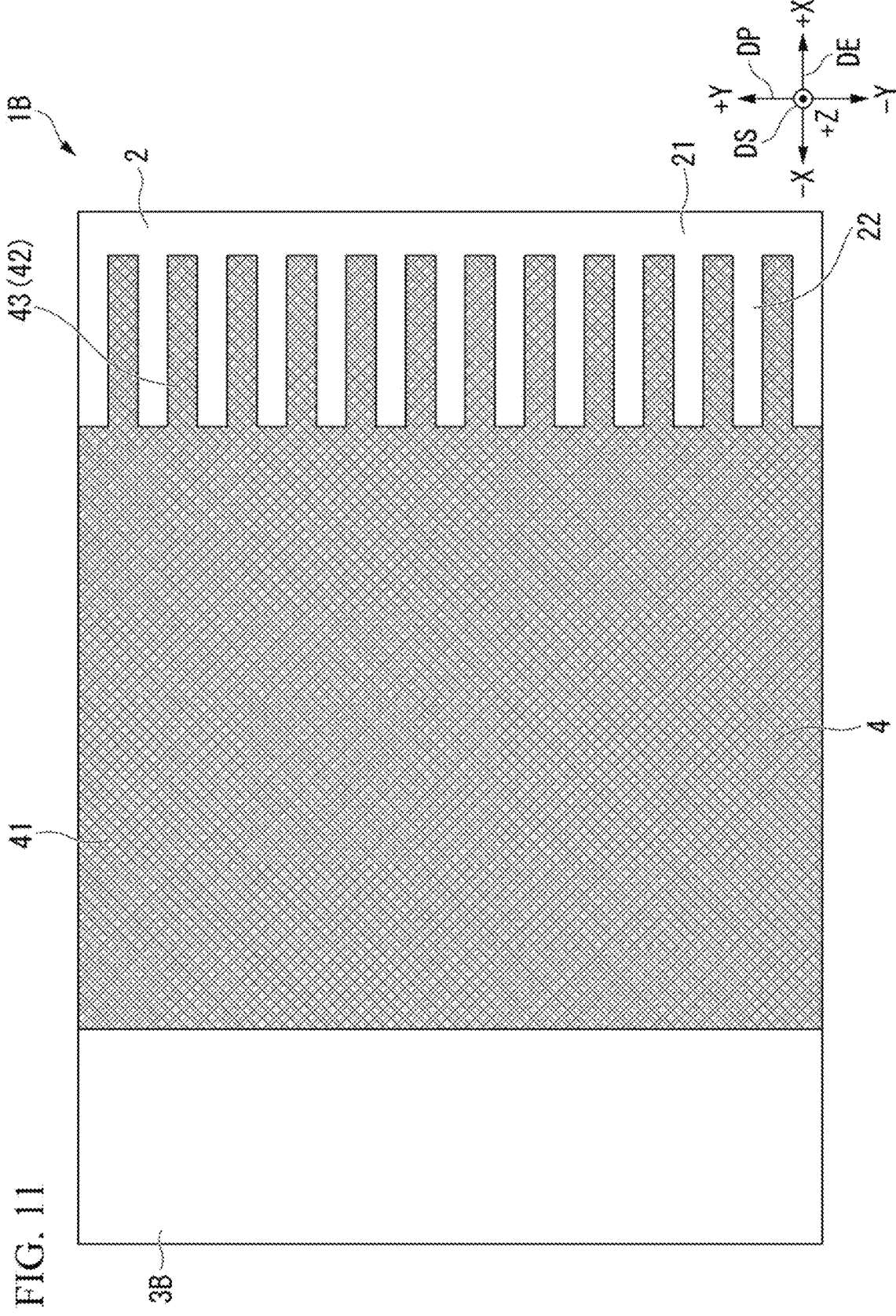
FIG. 11 is a plan view of a bolometer according to a third modification example of some example embodiments of the present disclosure.

As a modification example, as shown in FIG. 11, a bolometer 1B includes a first electrode 2 and a sensor unit 4 that are the same as those of the bolometer 1 according to the above-described example embodiments, but the bolometer 1B may include a second electrode 3B having a rectangular shape as a whole in a plan view when viewed in the −Z direction instead of the second electrode 3 of the bolometer 1.

According to such a modification example, a contact resistance between the sensor unit 4 and the first electrode 2 is decreased, and a change in an electrical resistance value due to heat generated in the sensor unit 4 is easily detected.

Fourth Modification Example

In the above-described example embodiments, the sensor film 41 is a carbon nanotube network film, but it may be configured as any film as long as the electrical resistance value of the sensor film 41 changes due to generated heat.

Figure 12:
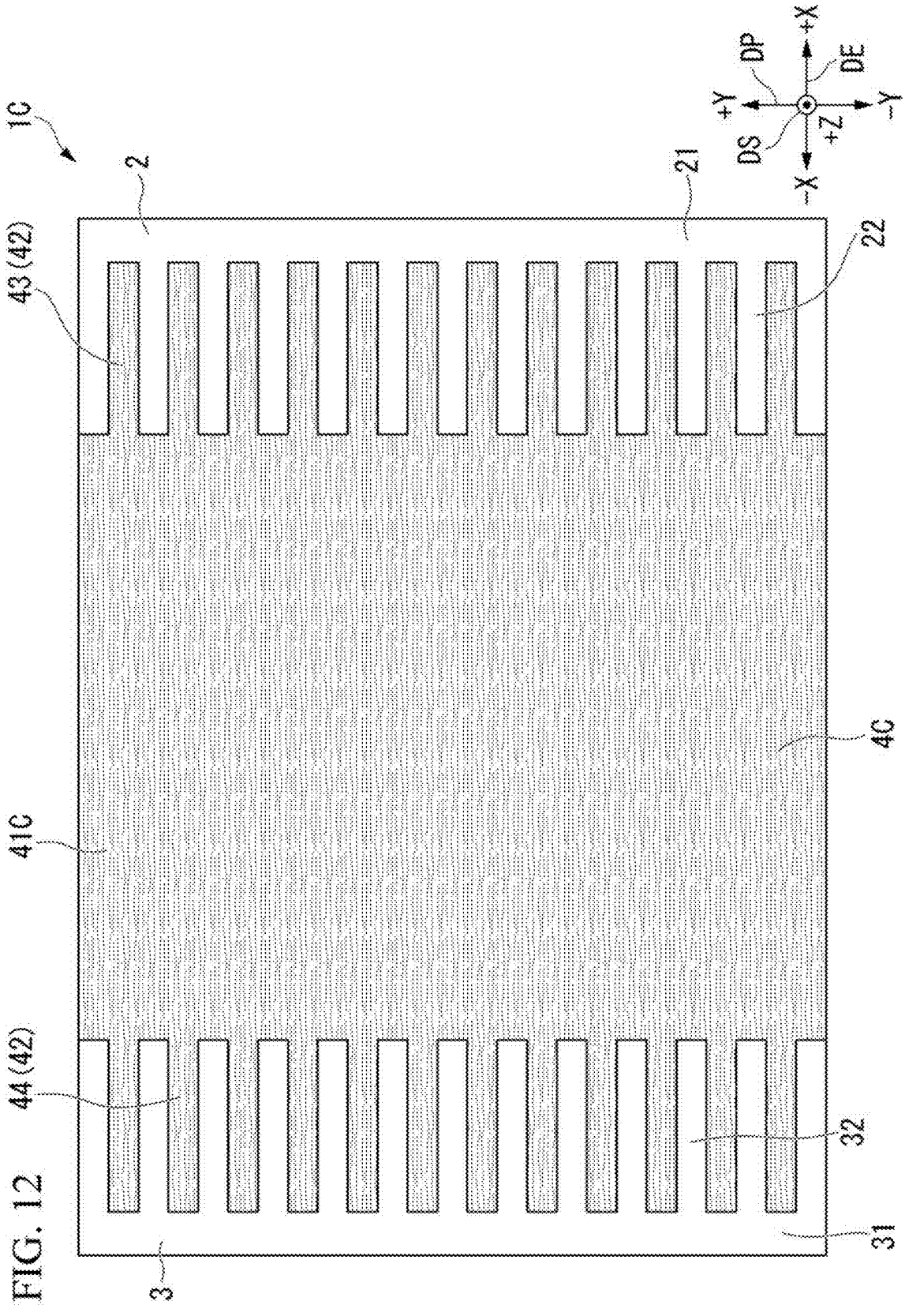
FIG. 12 is a plan view of a bolometer according to a fourth modification example of some example embodiments of the present disclosure.

As a modification example, as shown in FIG. 12, a bolometer 1C includes a first electrode 2 and a second electrode 3 that are the same as those of the bolometer 1 according to the above-described example embodiments, but the bolometer 1C may include a sensor unit 4C instead of the sensor unit 4 of the bolometer 1.

Here, the sensor unit 4C includes a sensor film 41C and a connection portion 42.

The sensor film 41C is electrically connected to the connection portion 42.

The sensor film 41C is a carbon nanotube film in which carbon nanotubes are oriented in the extension direction DE.

A carbon nanotube film in which carbon nanotubes are oriented in one direction can be manufactured, for example, by applying a dispersion liquid containing carbon nanotubes dispersed therein onto the insulating layer 6 by flowing it in one direction.

According to such a modification example, the electrical resistance value of the sensor unit 4C can be further reduced, and thus a change in the electrical resistance value due to heat generated in the sensor unit 4C can be easily detected.

Fifth Modification Example

In the above-described example embodiments, the first electrode 2 and the second electrode 3 have a rectangular wave shape in a plan view when viewed in the −Z direction, but the first electrode 2 and the second electrode 3 may be configured in any manner as long as the sensor unit 4 is configured to extend in the extension direction DE between the plurality of first inner surfaces 22S and between the plurality of second inner surfaces 32S.

Figure 13:
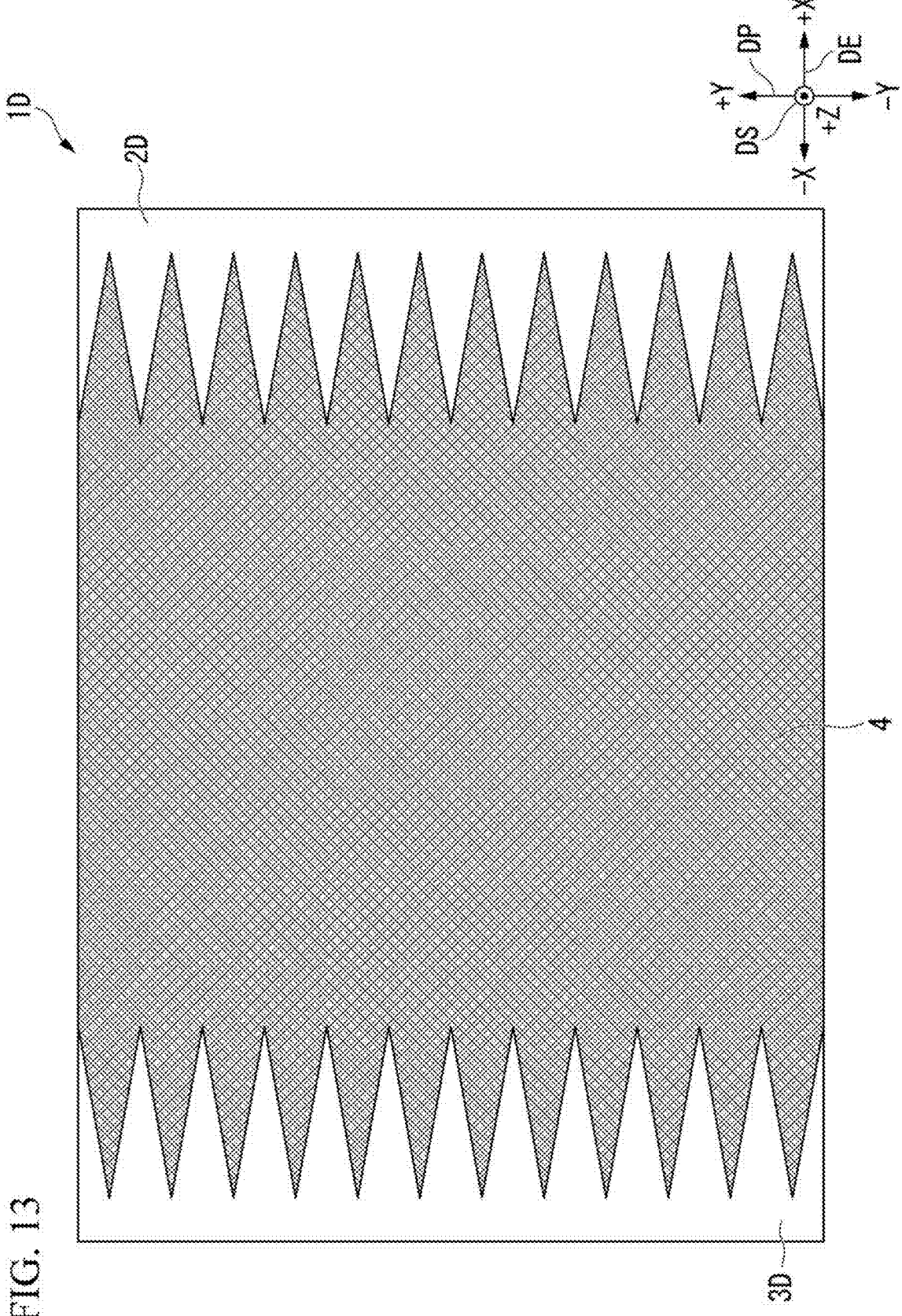
FIG. 13 is a plan view of a bolometer according to a fifth modification example of some example embodiments of the present disclosure.

As a modification example, as shown in FIG. 13, a bolometer 1D may include a first electrode 2D and a second electrode 3D instead of the first electrode 2 and second electrode 3 of the bolometer 1.

The first electrode 2D has a triangular wave shape on the −X side in a plan view when viewed in the −Z direction.

The second electrode 3D has a triangular wave shape on the +X side in a plan view when viewed in the −Z direction.

Sixth Modification Example

In the above-described example embodiments, the sensor unit 4 is directly stacked on the insulating layer 6, but the connection portion 42 may be stacked on the insulating layer 6 in any manner as long as the connection portion 42 electrically connects the plurality of first inner surfaces 22S and the plurality of second inner surfaces 32S to the sensor film 41.

Figure 14:
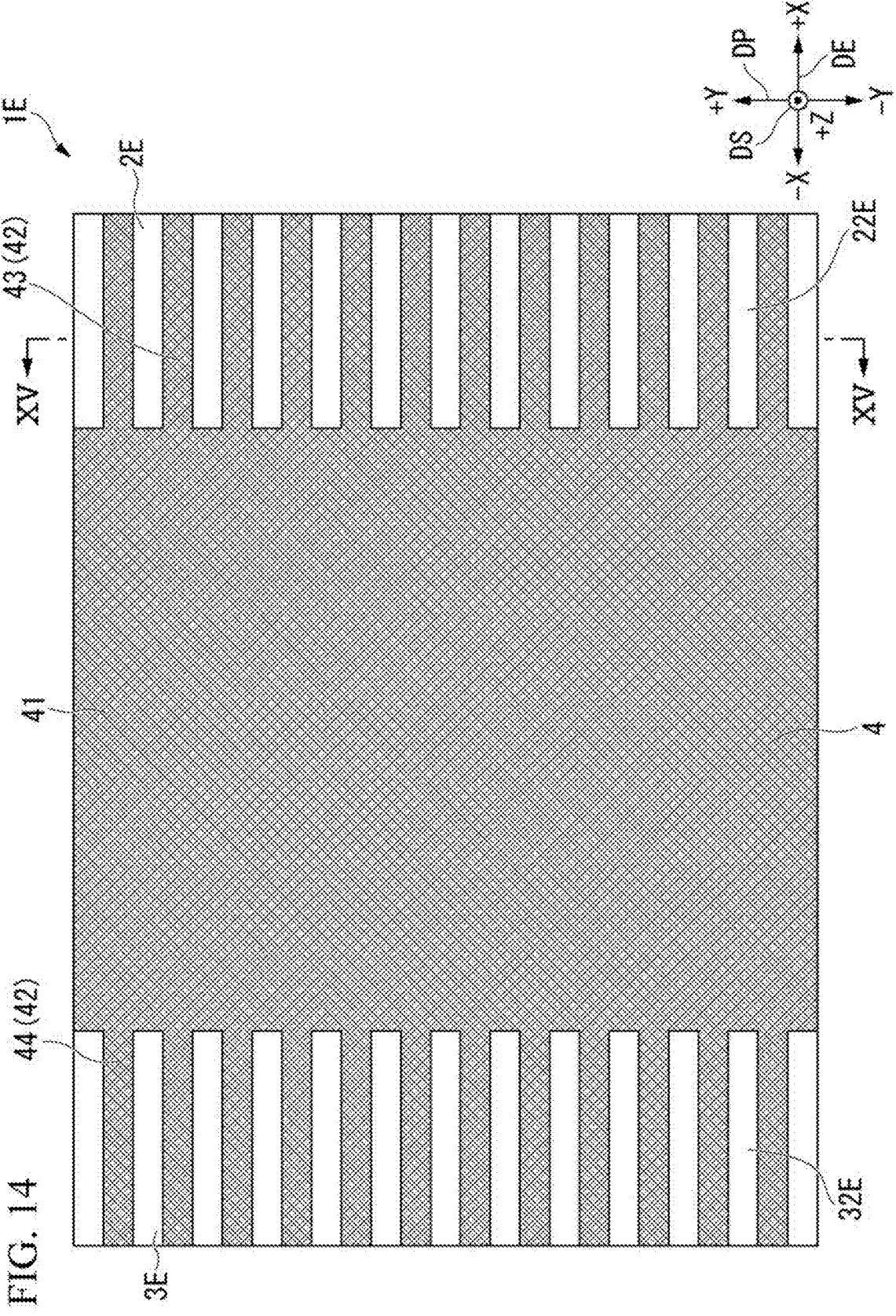
FIG. 14 is a plan view of a bolometer according to a sixth modification example of some example embodiments of the present disclosure.

As a modification example, as shown in FIG. 14, a bolometer 1E may include a first electrode 2E and a second electrode 3E instead of the first electrode 2 and the second electrode 3 of the bolometer 1. In this case, as shown in FIG. 14, the first electrode 2E may include a plurality of first extending portions 22E, but may not include a first base portion. Similarly, the second electrode 3E may include a plurality of second extending portions 32E, but may not include a second base portion.

Figure 15:
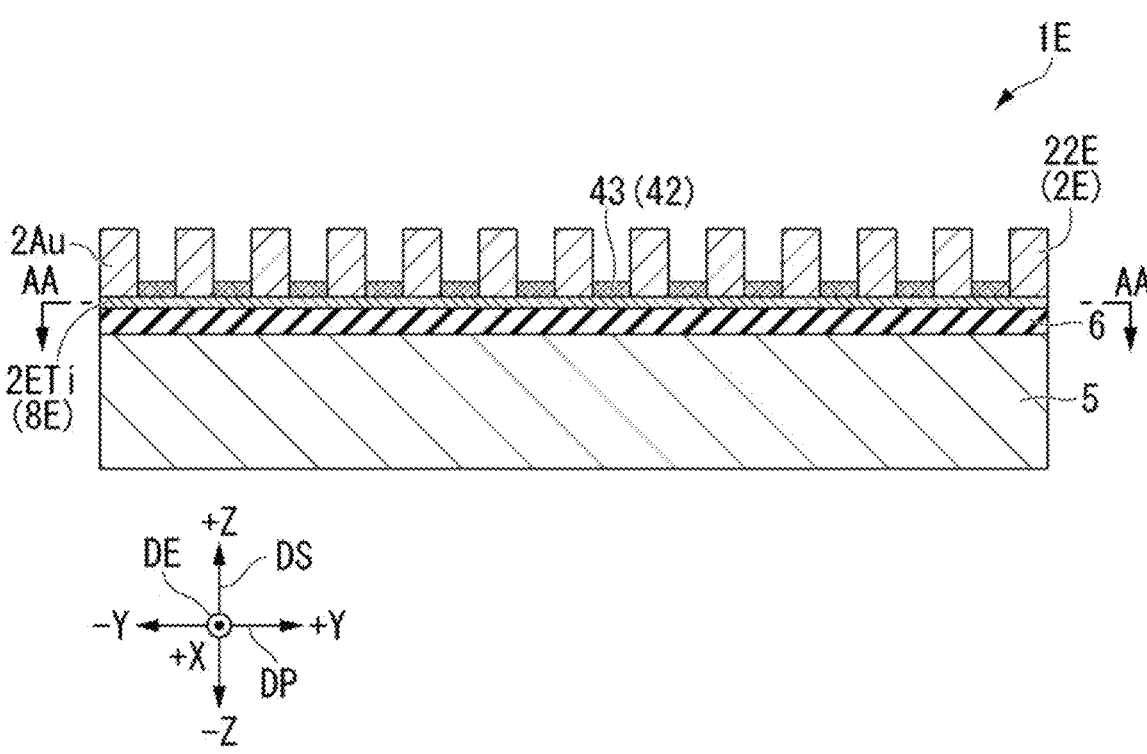

As shown in FIG. 15, each of the first extending portions 22E of the first electrode 2E is constituted by a gold layer 2Au.

The bolometer 1E includes, as a base electrode, a first base electrode 8E that electrically connects the plurality of first extending portions 22E in the arrangement direction DP.

The first base electrode 8E is a titanium layer 2ETi.

The first base electrode 8E extends in the arrangement direction DP under the plurality of first extending portions 22E and under the connection portion 42 therebetween.

The first base electrode 8E spans the lower surfaces of the plurality of first extending portions 22E and the lower surface of the connection portion 42 therebetween, and extends continuously on the insulating layer 6 in the arrangement direction DP while being in contact with the lower surfaces of the first extending portions 22E and the lower surface of the connection portion 42 therebetween.

The plurality of second extending portions 32E of the second electrode 3E and the base electrode thereof are configured in the same manner as the plurality of first extending portions 22E of the first electrode 2E and the first base electrode 8E.

According to such a modification example, not only the side surface of the connection portion 42 but also the lower surface of the connection portion 42 is electrically connected to the first electrode 2E and the second electrode 3E via the base electrode.

For this reason, a contact resistance between the sensor unit 4, the first electrode 2E and the second electrode 3E is further reduced, making it easy to detect a change in an electrical resistance value due to heat generated in the sensor unit 4.

Seventh Modification Example

In the above-described example embodiments, the sensor unit 4 is directly stacked on the insulating layer 6, but the connection portion 42 may be stacked on the insulating layer 6 in any manner as long as the connection portion 42 electrically connects the plurality of first inner surfaces 22S and the plurality of second inner surfaces 32S to the sensor film 41.

Figure 16:
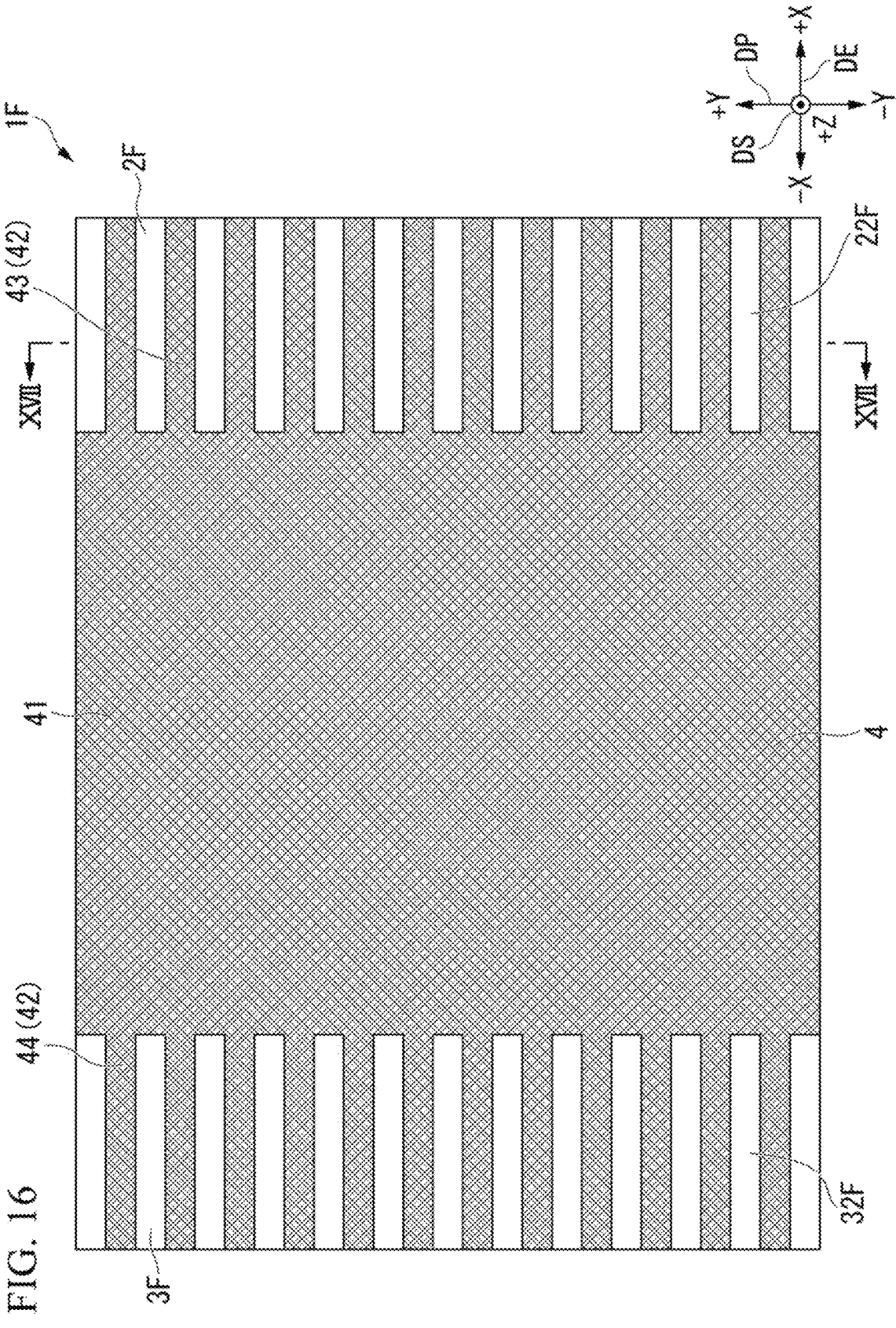
FIG. 16 is a plan view of a bolometer according to a seventh modification example of some example embodiments of the present disclosure.

As a modification example, as shown in FIG. 16, a bolometer 1F may include a first electrode 2F and a second electrode 3F instead of the first electrode 2 and the second electrode 3 of the bolometer 1. In this case, as shown in FIG. 16, the first electrode 2F may include a plurality of first extending portions 22F, but may not include a first base portion. Similarly, the second electrode 3F may include a plurality of second extending portions 32F, but may not include a second base portion.

Figure 17:
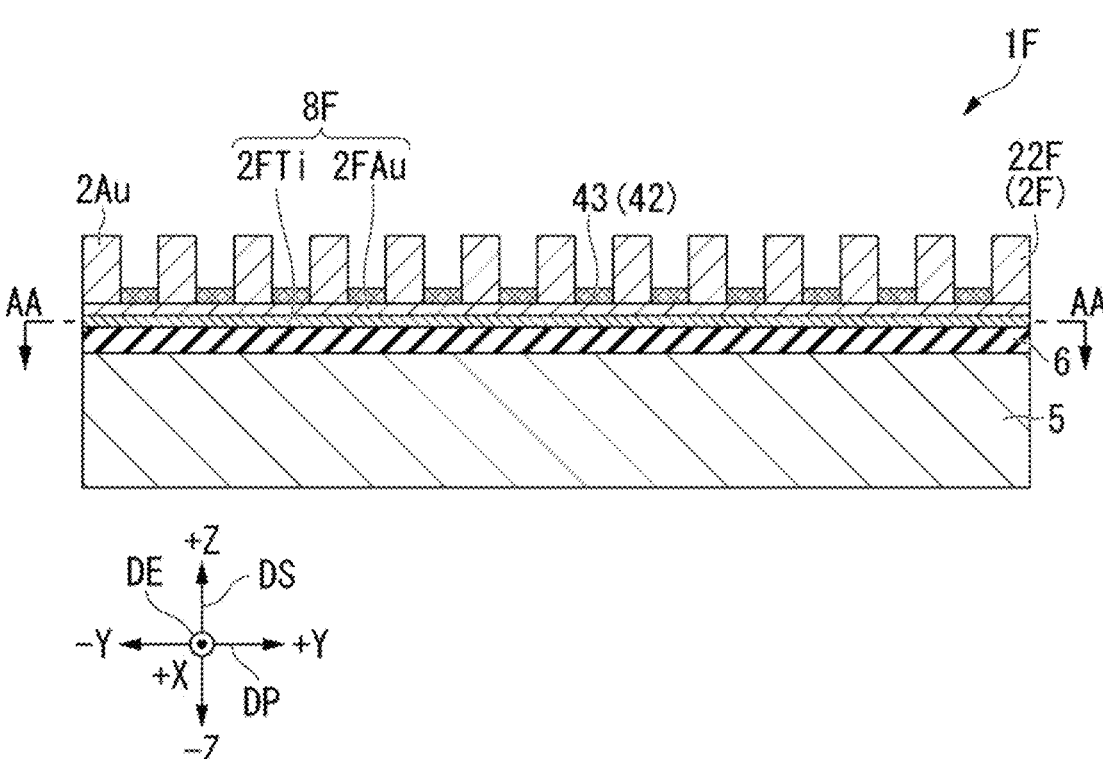
FIG. 17 is a cross-sectional view of a cut portion taken along a line XVII-XVII in FIG. 16.

As shown in FIG. 17, each of the first extending portions 22F of the first electrode 2F is constituted by a gold layer 2Au.

The bolometer 1F includes, as a base electrode, a first base electrode 8F that electrically connects the plurality of first extending portions 22F in the arrangement direction DP.

The first base electrode 8F has a stacked structure including an intermediate layer 2FAu made of gold and a titanium layer 2FTi.

The first base electrode 8F extends in the arrangement direction DP under the plurality of first extending portions 22F and under the connection portion 42 therebetween.

The first base electrode 8F spans the lower surfaces of the plurality of first extending portions 22F and the lower surface of the connection portion 42 therebetween, and extends continuously on the insulating layer 6 in the arrangement direction DP while being in contact with the lower surfaces of the first extending portions 22F and the lower surface of the connection portion 42 therebetween. At this time, the intermediate layer 2FAu is in contact with the lower surfaces of the first extending portions 22F.

The plurality of second extending portions 32F of the second electrode 3F and the base electrode thereof are configured in the same manner as the plurality of first extending portions 22F of the first electrode 2F and the first base electrode 8F.

According to such a modification example, a contact area between titanium and gold is larger than in the sixth modification example, and thus the intermediate layer and the gold layer stacked on the titanium layer are not likely to be peeled off.

Thus, it is possible to provide the bolometer IF which is structurally strong.

Figure 18:
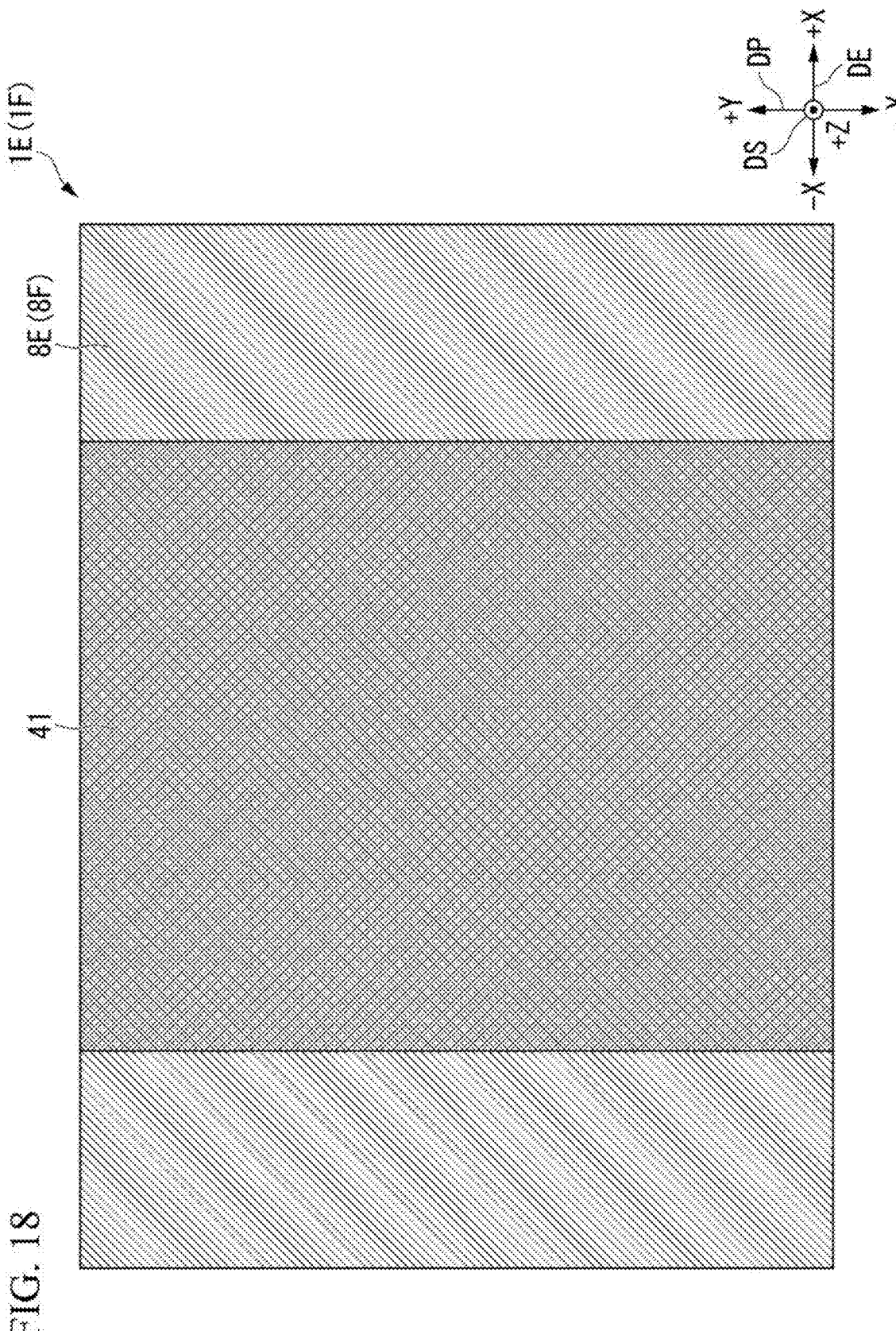
FIG. 18 is a cross-sectional view taken along a line AA-AA of an example of the bolometer according to the sixth modification example or the seventh modification example of some example embodiments of the present disclosure.
Figure 19:
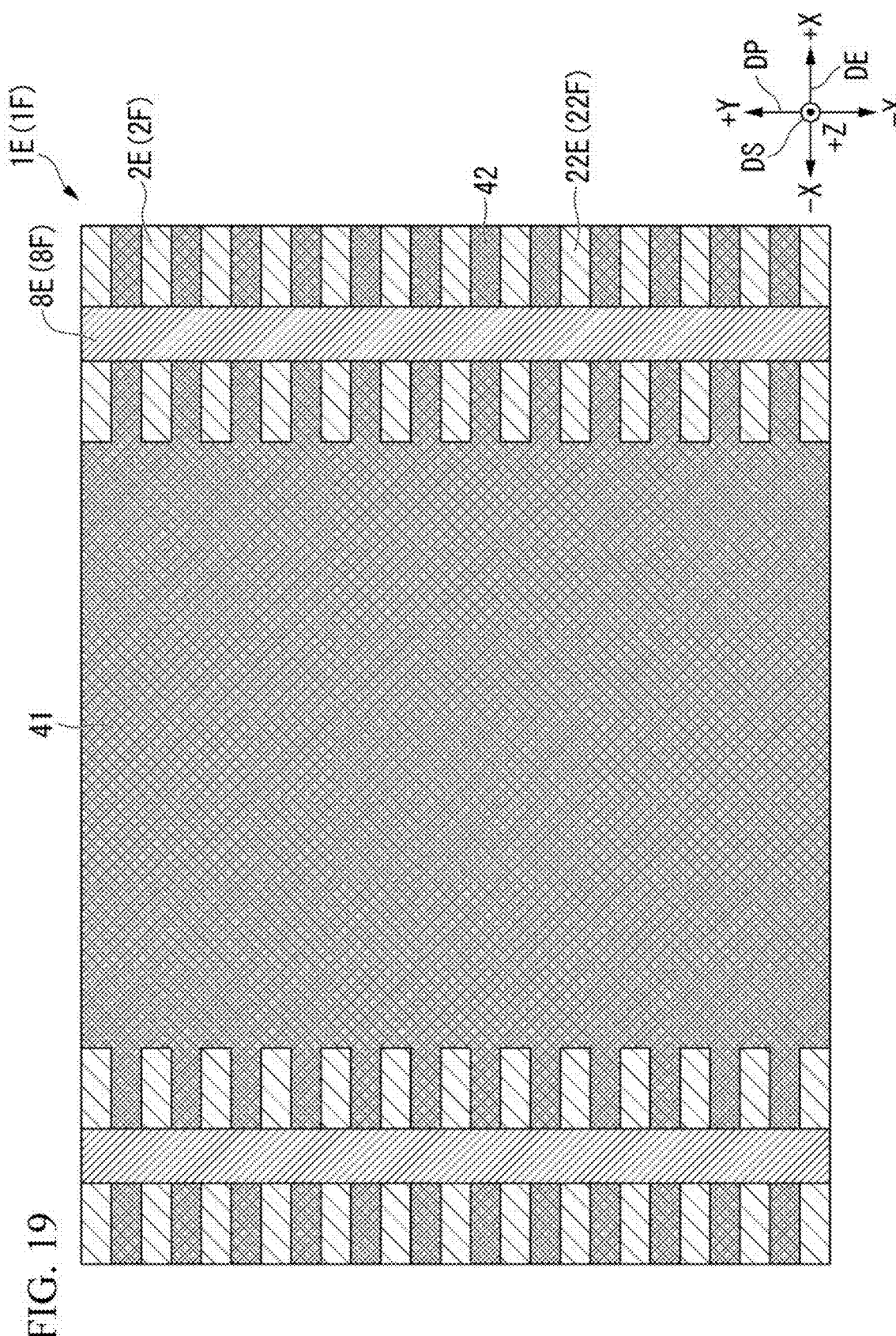
FIG. 19 is a cross-sectional view taken along a line AA-AA of another example of the bolometer according to the sixth modification example or the seventh modification example of some example embodiments of the present disclosure.

In the above-described sixth modification example and seventh modification example, the base electrode may be provided below the first electrode and the second electrode in the entire extension direction DE as shown in FIG. 18 as an example, or may be provided only at ends and a portion of the center under the first electrode and the second electrode in the extension direction DE as shown in FIG. 19 as another example.

Hereinafter, some example embodiments according to the present disclosure will be described using FIG. 20.

A bolometer 101 of the present example embodiments has the same configuration as the bolometer 1 according to the above-described example embodiments except for points to be described below, operates in the same manner, and has the same actions and effects.

Figure 20:
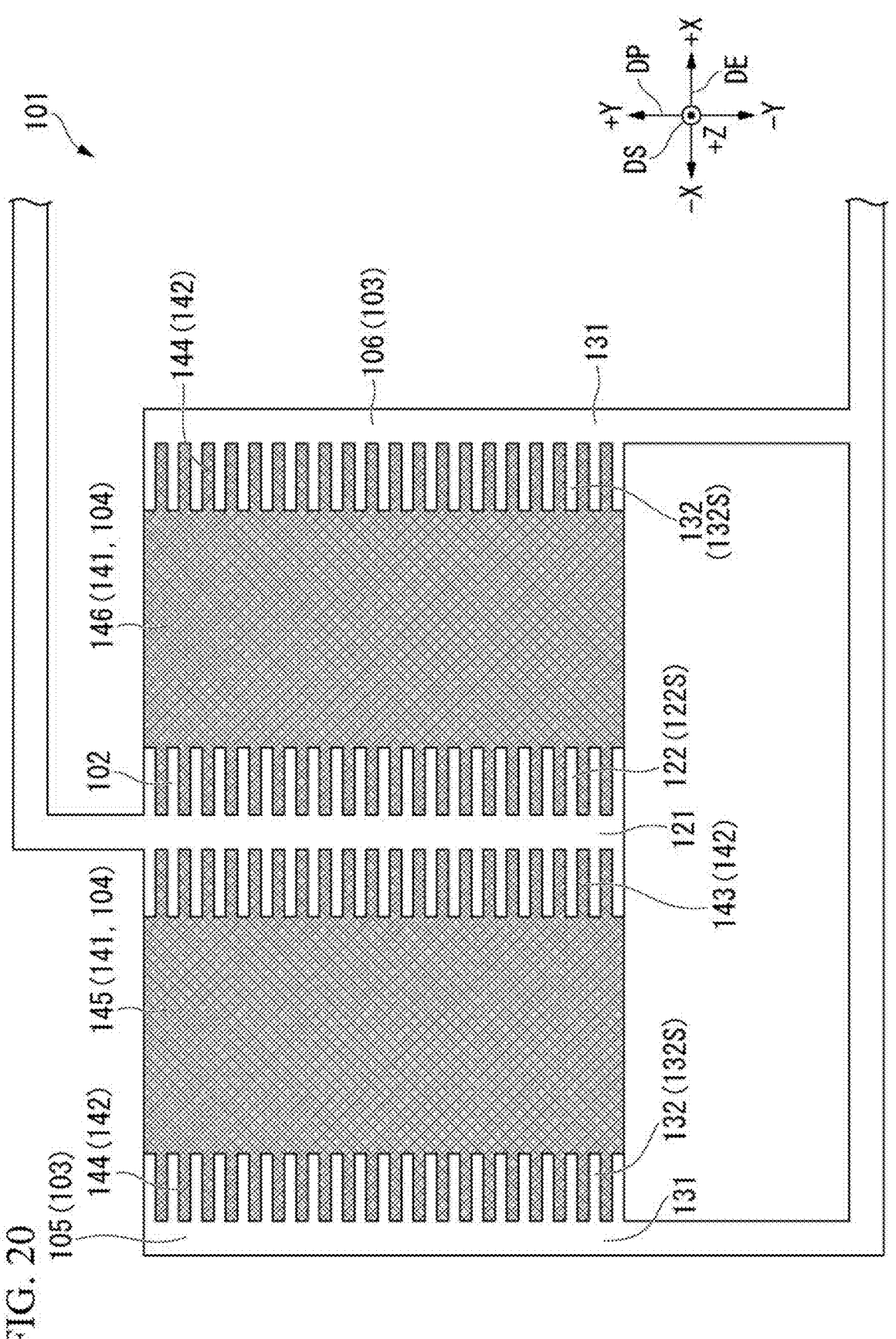
FIG. 20 is a plan view of a bolometer according to some example embodiments of the present disclosure.

As shown in FIG. 20, the bolometer 101 includes a first electrode 102, a second electrode 103, and a sensor unit 104.

The first electrode 102 includes a first base portion 121 and a plurality of first extending portions 122.

The first electrode 102 has a comb shape as a whole in which comb teeth extend in the +X direction and the −X direction in a plan view when viewed in the −Z direction.

The first base portion 121 extends in an arrangement direction DP at the center of the bolometer 101 in an extension direction DE.

Each of the first extending portions 122 extends from the first base portion 121 toward the second electrode 103 in the extension direction DE (+X direction and −X direction).

The plurality of first extending portions 122 have a plurality of first inner surfaces 122S arranged in the arrangement direction DP.

Each of the first inner surfaces 122S extends from the first base portion 121 toward the second electrode 103 in the extension direction DE (+X direction and −X direction).

The second electrode 103 includes a third electrode 105 and a fourth electrode 106.

The third electrode 105 faces the first electrode 102 on the −X side of the first electrode 102 while being separated from the first electrode 102 in the extension direction DE.

The fourth electrode 106 faces the first electrode 102 on the +X side of the first electrode 102 while being separated from the first electrode 102 in the extension direction DE.

The third electrode 105 and the fourth electrode 106 face each other with the first electrode 102 interposed therebetween.

Each of the third electrode 105 and the fourth electrode 106 includes a second base portion 131 and a plurality of second extending portions 132.

The third electrode 105 has a comb shape, as a whole, in which comb teeth extends in the +X direction in a plan view when viewed in the −Z direction.

The second base portion 131 of the third electrode 105 extends in the arrangement direction DP at one end (one end on the −X direction side) of both ends of the bolometer 101 in the extension direction DE.

The plurality of second extending portions 132 of the third electrode 105 extend in the extension direction DE (+X direction) from the second base portion 131 of the third electrode 105 toward the first electrode 102.

The fourth electrode 106 has a comb shape as a whole in which comb teeth extend in the −X direction in a plan view when viewed in the −Z direction.

The second base portion 131 of the fourth electrode 106 extends in the arrangement direction DP at the other end (one end on the +X direction side) of both ends of the bolometer 101 in the extension direction DE.

The plurality of second extending portions 132 of the fourth electrode 106 extend in the extension direction DE (−X direction) from the second base portion 131 of the fourth electrode 106 toward the first electrode 102.

The plurality of second extending portions 132 have a plurality of second inner surfaces 132S arranged in the arrangement direction DP.

Each of the second inner side surfaces 132S of the third electrode 105 extends in the extension direction DE (+X direction) from the second base portion 131 of the third electrode 105 toward the first electrode 102.

Each of the second inner surfaces 132S of the fourth electrode 106 extends in the extension direction DE (−X direction) from the second base portion 131 of the fourth electrode 106 toward the first electrode 102.

The sensor unit 104 includes a sensor film 141 and a connection portion 142.

The sensor film 141 includes a first sensor film 145 and a second sensor film 146.

The first sensor film 145 is a film that extends to a region between the first electrode 102 and the third electrode 105.

The first sensor film 145 has a rectangular shape in which one side thereof extends in the extension direction DE and the other side thereof extends in the arrangement direction DP in a plan view when viewed in the −Z direction.

The first sensor film 145 and the connection portion 142 are electrically connected and formed integrally.

The second sensor film 146 is a film that extends to a region between the first electrode 102 and the fourth electrode 106.

The second sensor film 146 has a rectangular shape in which one side thereof extends in the extension direction DE and the other side thereof extends in the arrangement direction DP in a plan view when viewed in the −Z direction.

The second sensor film 146 and the connection portion 142 are electrically connected and formed integrally.

The third electrode 105, the first sensor film 145, the first electrode 102, the second sensor film 146, and the fourth electrode 106 are arranged in order in the extension direction DE.

The connection portion 142 includes a plurality of first connection patterns 143 and a plurality of second connection patterns 144.

Each of the first connection patterns 143 extends between the related first inner surfaces 122S in the extension direction DE.

The first connection patterns 143 are in contact with the plurality of first inner surfaces 122S to electrically connect the plurality of first inner surfaces 122S to the first sensor film 145 and the second sensor film 146.

Similarly, each of the second connection patterns 144 extends between the related second inner surfaces 132S in the extension direction DE.

The second connection patterns 144 are in contact with the plurality of second inner surfaces 132S to electrically connect the plurality of second inner surfaces 132S to the first sensor film 145 and the second sensor film 146.

Actions and Effects

In the bolometer 101 of the present example embodiments, the sensor unit 104 extends in the extension direction DE between the plurality of first inner surfaces 122S.

For this reason, similarly to the above-described example embodiments, the contact resistance between the sensor unit 104 and the first electrode 102 decreases, and a change in the electrical resistance value due to heat generated in the sensor unit 104 is easily detected.

Thus, according to the bolometer 101 of the present example embodiments, a decrease in detection sensitivity can be suppressed.

The modification examples described in the above-described example embodiments can also be applied to the present example embodiment.

Hereinafter, some example embodiments of a bolometer according to the present disclosure will be described using FIGS. 21 and 22.

(Configuration of Bolometer)

Figure 21:
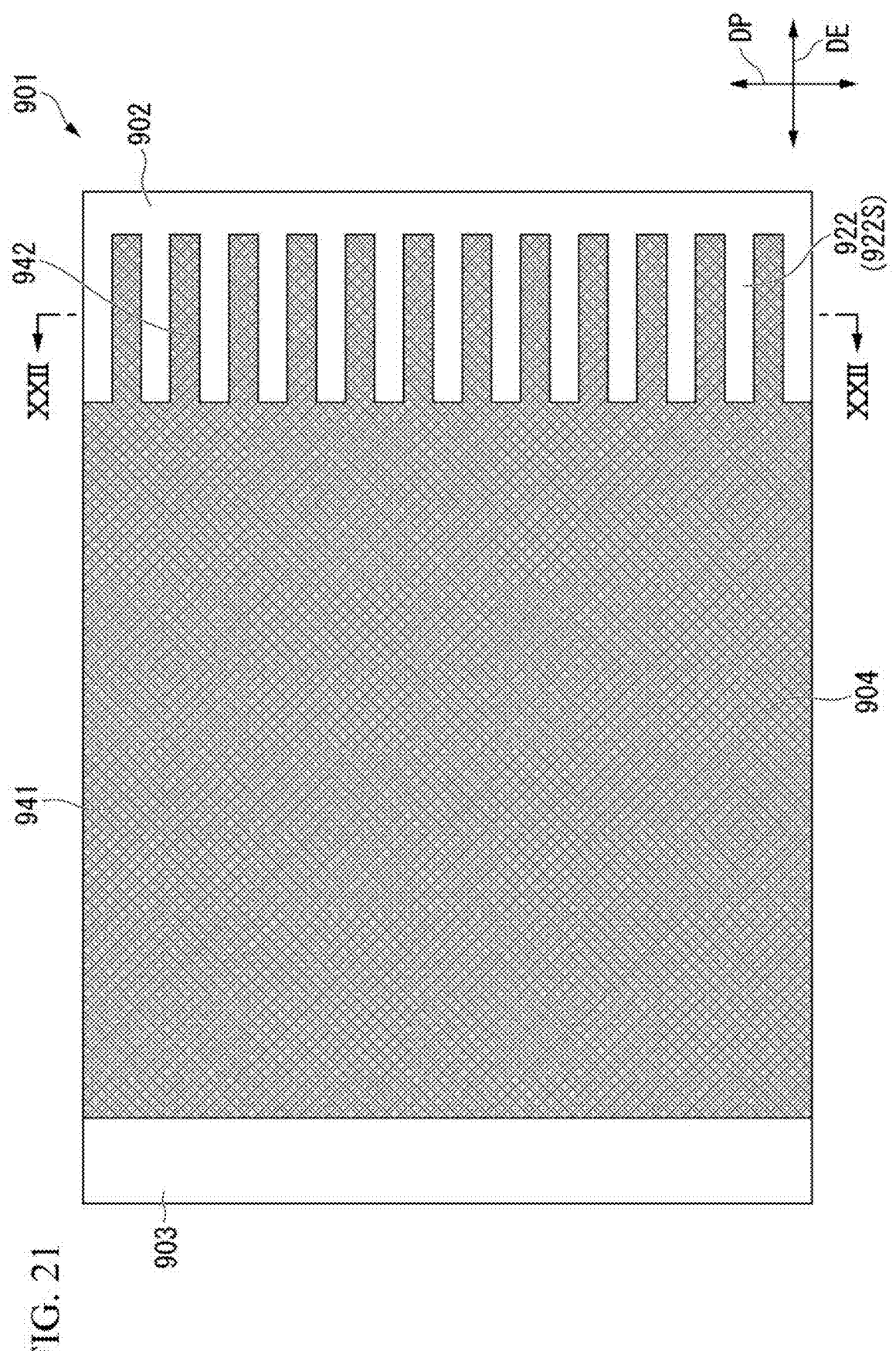
FIG. 21 is a plan view of a bolometer according to some example embodiments of the present disclosure.

As shown in FIG. 21, a bolometer 901 includes a first electrode 902, a second electrode 903, and a sensor unit 904.

The first electrode 902 includes a plurality of first extending portions 922.

Figure 22:
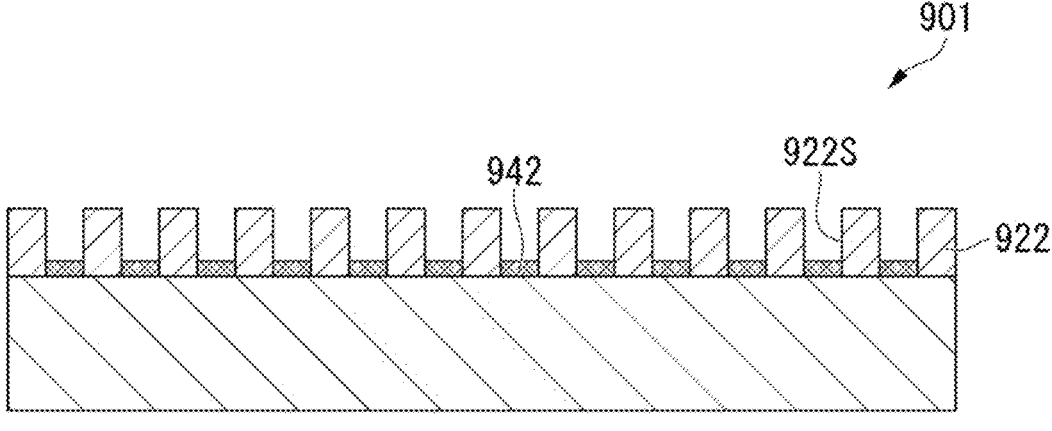
FIG. 22 is a cross-sectional view of a cut portion taken along a line XXII-XXII in FIG. 21.
Figure 22:
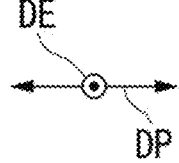

As shown in FIG. 22, the plurality of first extending portions 922 have a plurality of first inner surfaces 922S arranged in the arrangement direction DP.

Each of the first inner surfaces 922S extends in the extension direction DE intersecting the arrangement direction DP.

The second electrode 903 faces the first electrode 902 while being separated from the first electrode 902 in the extension direction DE.

The sensor unit 904 includes a sensor film 941 and a connection portion 942.

The first electrode 902, the sensor film 941, and the second electrode 903 are arranged in order in the extension direction DE.

The connection portion 942 extends in the extension direction DE between the plurality of first inner surfaces 922S and electrically connects the plurality of first inner surfaces 922S and the sensor film 941.

The sensor unit 904 includes carbon nanotubes.

Actions and Effects

In the bolometer 901 of the present example embodiments, the sensor unit 904 extends in the extension direction DE between the plurality of first inner surfaces 922S.

According to such a configuration, the connection portion 942 extends in the extension direction DE between the plurality of first inner surfaces 922S, and thus a contact area between the sensor unit 904 and the first electrode 902 increases.

In addition, according to such a configuration, the axes of the carbon nanotubes included in the sensor unit 904 tend to be oriented in the extension direction DE between the plurality of first inner surfaces 922S. Thereby, a contact area between a peripheral wall of the carbon nanotube included in the sensor unit 904 and the plurality of first inner surfaces 922S increases.

For this reason, a contact resistance between the sensor unit 904 and the first electrode 902 decreases, and a change in an electrical resistance value due to heat generated in the sensor unit 904 is easily detected.

Thus, according to the bolometer 901 of the present example embodiments, a decrease in detection sensitivity can be suppressed.

Hereinafter, some example embodiments of a bolometer manufacturing method according to the present disclosure will be described using FIG. 23.

(Bolometer Manufacturing Method)

Figure 23:
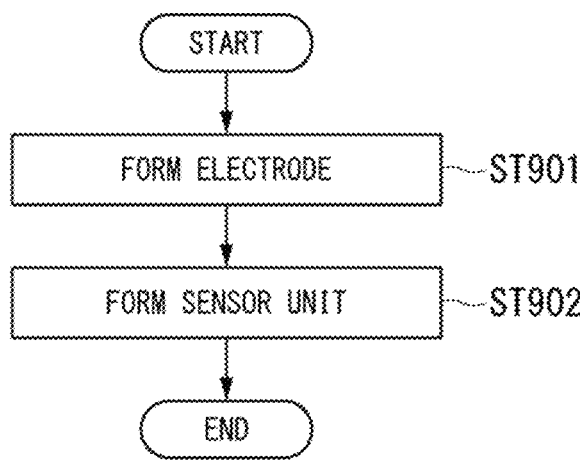
FIG. 23 is a flowchart of a bolometer manufacturing method according to some example embodiments of the present disclosure.

As shown in FIG. 23, in the bolometer manufacturing method, a first electrode and a second electrode are formed (ST901: Electrode forming step), and a sensor unit is formed (ST902: Sensor unit forming step).

The first electrode includes a plurality of first extending portions.

The plurality of first extending portions have a plurality of first inner surfaces arranged in an arrangement direction.

The first inner surfaces extend in an extension direction intersecting the arrangement direction.

The second electrode faces the first electrode while being separated from the first electrode in the extension direction.

The sensor unit includes a sensor film and a connection portion.

The first electrode, the sensor film, and the second electrode are arranged in order in the extension direction.

The connection portion extends in the extension direction between the plurality of first inner surfaces and electrically connects the plurality of first inner surfaces and the sensor film.

The sensor unit includes carbon nanotubes.

Actions and Effects

In the bolometer manufactured by the bolometer manufacturing method of the present example embodiments, the sensor unit extends in the extension direction between the plurality of first inner surfaces.

According to such a configuration, the connection portion extends in the extension direction between the plurality of first inner surfaces, and thus a contact area between the sensor unit and the first electrode increases.

In addition, according to such a configuration, the axes of the carbon nanotubes included in the sensor unit tend to be oriented in the extension direction between the plurality of first inner surfaces. Thereby, a contact area between a peripheral wall of the carbon nanotube included in the sensor unit and the plurality of first inner surfaces increases.

For this reason, a contact resistance between the sensor unit and the first electrode decreases, and a change in an electrical resistance value due to heat generated in the sensor unit is easily detected.

Thus, according to the bolometer manufactured by the bolometer manufacturing method of the present example embodiments, a decrease in detection sensitivity can be suppressed.

Although the example embodiments of the present disclosure have been described above, these example embodiments are shown as examples and are not intended to limit the scope of the present disclosure. These example embodiments can be implemented in various other forms, and various omissions, substitutions, and changes can be made without departing from the gist of the present disclosure. Each of the example embodiments can be combined with other example embodiments.

Hereinafter, the present disclosure will be described in more detail with reference to examples, but the present disclosure is not limited to the following examples.

Figure 24:
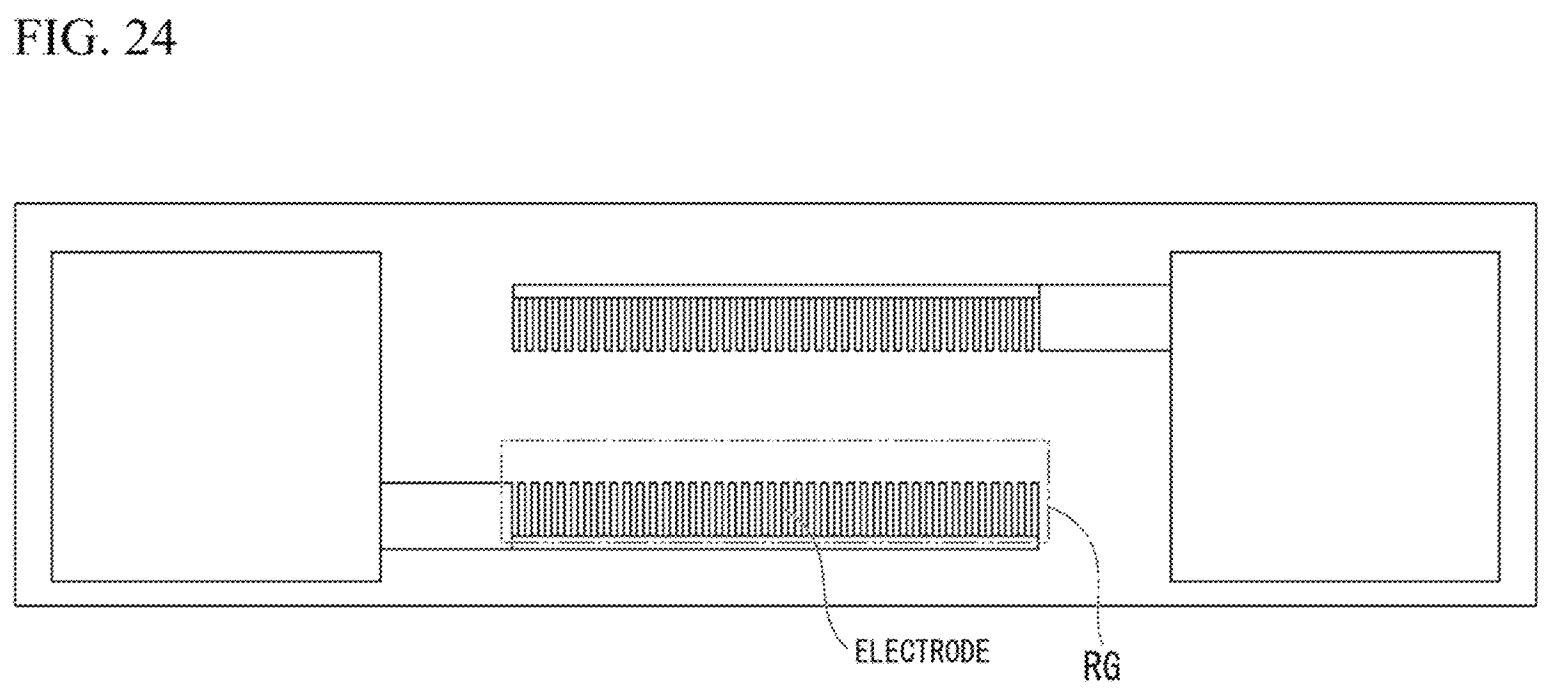
Figures 25, 26:
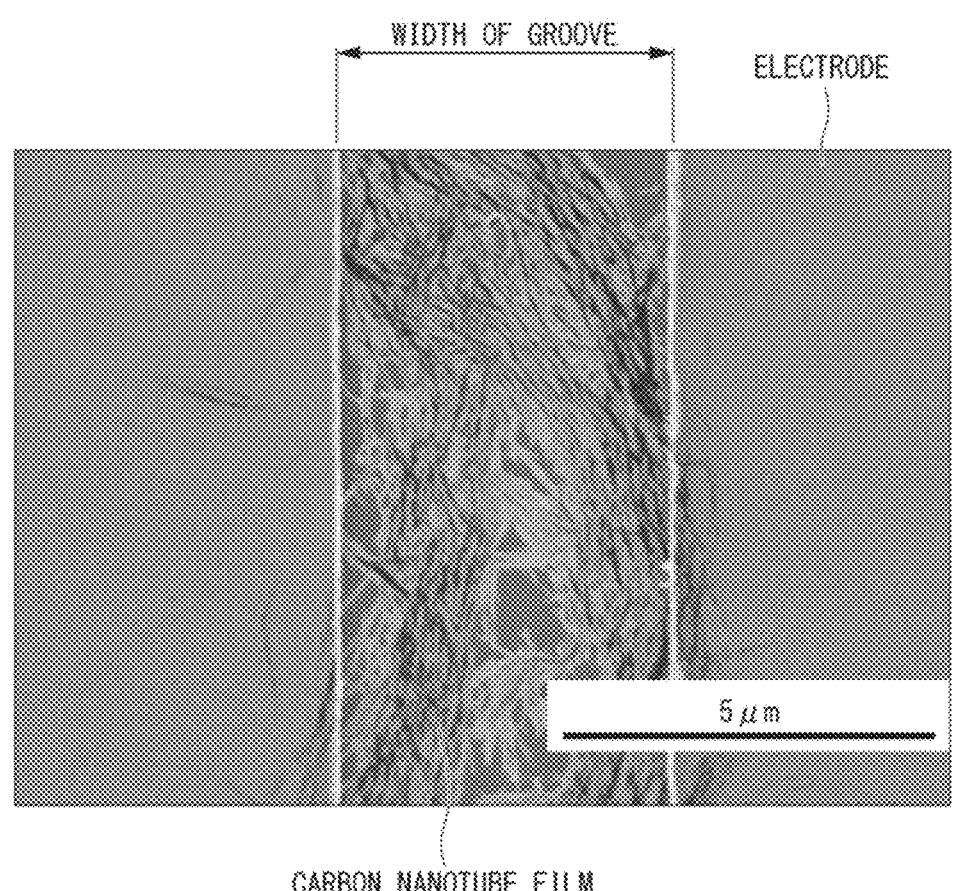
FIG. 25 is a scanning electron microscope image of a carbon nanotube film in a groove observed in the example of the present disclosure.
FIG. 26 is a table showing a relationship between an electrode groove width (electrode circumference length) and a resistance value examined in an example of the present disclosure.

In the present example, a comb-shaped electrode (a width of a groove between comb teeth is 5 µm) as shown in FIG. 24 was actually prepared, a carbon nanotube film which was coated with a dispersion liquid containing carbon nanotubes dispersed therein and was then dried was prepared, and a scanning electron microscope (SEM) image as shown in FIG. 25 was observed.

As a result, it was observed that the carbon nanotubes were oriented parallel to the electrode in the grooves formed between the comb teeth of the electrode. Due to this orientation, not only the axial cross-sections of the carbon nanotubes but also peripheral walls of the carbon nanotubes are in contact with the inner surface of the electrode, and thus it is considered that a contact area of the inner surface of the electrode increases. It is also considered that the film thickness of a carbon nanotube film increases due to an effect of the carbon nanotubes being bundled and a carbon nanotube dispersion liquid being collected in the grooves formed between the comb teeth of the electrode.

Furthermore, when a carbon nanotube film is formed on an electrode having a groove structure as shown in FIG. 24, a contact area between an electrode wall and carbon nanotubes increases, and thus it is possible to achieve a reduction in the resistance of the bolometer. FIG. 26 shows results obtained by examining a relationship between the width of an electrode groove (µm), the length of an electrode circumference (µm) with respect to the width of the electrode groove which is estimated in a region RG shown in FIG. 24, and a resistance value measured at an application voltage of 3 V. Comparing the resistance values for respective groove widths, it was found that a lower resistance is obtained in the case of a narrower groove.

Some or all of the above-described example embodiments may be as described in the following supplementary notes, but are not limited to the following.

(Supplementary Note 1)

A bolometer including:

a first electrode including a plurality of first extending portions having a plurality of first inner surfaces arranged in an arrangement direction, each of the first inner surfaces extending in an extension direction intersecting the arrangement direction;

a second electrode facing the first electrode while being separated from the first electrode in the extension direction; and a sensor including a sensor film and a connection portion, wherein the first electrode, the sensor film, and the second electrode are arranged in order in the extension direction, the connection portion extends in the extension direction, is provided between the plurality of first inner surfaces, and electrically connects the plurality of first inner surfaces and the sensor film, and the sensor includes carbon nanotubes.

(Supplementary Note 2)

The bolometer according to supplementary note 1, wherein the second electrode includes a plurality of second extending portions having a plurality of second inner surfaces arranged in the arrangement direction, each of the second inner surfaces extend in the extension direction.

(Supplementary Note 3)

The bolometer according to supplementary note 1 or 2, wherein, in the connection portion, the carbon nanotubes are oriented in the extension direction or bundled to be arranged in the extension direction.

(Supplementary Note 4)

The bolometer according to any one of supplementary note 1 to 3, further including a base electrode electrically connecting the plurality of first extending portions in the arrangement direction.

(Supplementary Note 5)

The bolometer according to any one of supplementary notes 1 to 4, wherein the first electrode has a triangular wave shape or a rectangular wave shape.

(Supplementary Note 6)

The bolometer according to any one of supplementary notes 1 to 5, wherein a thickness of the connection portion is greater than a thickness of the sensor film.

(Supplementary Note 7)

The bolometer according to any one of supplementary notes 1 to 6, wherein an interval between the plurality of first extending portions is smaller than an interval between the first electrode and the second electrode.

(Supplementary Note 8)

The bolometer according to any one of supplementary notes 1 to 7, wherein the carbon nanotubes include semiconductor-type carbon nanotubes.

(Supplementary Note 9)

A bolometer manufacturing method including:

forming a first electrode and a second electrode, the first electrode including a plurality of first extending portions having a plurality of first inner surfaces arranged in an arrangement direction, each of the first inner surfaces extending in an extension direction intersecting the arrangement direction, the second electrode facing the first electrode while being separated from the first electrode in the extension direction; and forming a sensor including a sensor film and a connection portion, wherein the first electrode, the sensor film, and the second electrode are arranged in order in the extension direction, the connection portion extends in the extension direction, is provided between the plurality of first inner surfaces, and electrically connects the plurality of first inner surfaces and the sensor film, and the sensor includes carbon nanotubes.

(Supplementary Note 10)

The bolometer manufacturing method according to supplementary note 9, wherein the second electrode includes a plurality of second extending portions having a plurality of second inner surfaces arranged in the arrangement direction, each of the second inner surfaces extend in the extension direction.

(Supplementary Note 11)

The bolometer manufacturing method according to supplementary note 9 or 10, wherein, in the connection portion, the carbon nanotubes are oriented in the extension direction or bundled to be arranged in the extension direction.

(Supplementary Note 12)

The bolometer manufacturing method according to any one of supplementary notes 9 to 11, wherein a base electrode electrically connects the plurality of first extending portions in the arrangement direction.

(Supplementary Note 13)

The bolometer manufacturing method according to any one of supplementary notes 9 to 12, wherein the first electrode has a triangular wave shape or a rectangular wave shape.

(Supplementary Note 14)

The bolometer manufacturing method according to any one of supplementary notes 9 to 13, wherein a thickness of the connection portion is greater than a thickness of the sensor film.

(Supplementary Note 15)

The bolometer manufacturing method according to any one of supplementary notes 9 to 14, wherein an interval between the plurality of first extending portions is smaller than an interval between the first electrode and the second electrode.

(Supplementary note 16)

The bolometer manufacturing method according to any one of supplementary notes 9 to 15, wherein the carbon nanotubes include semiconductor-type carbon nanotubes.

According to the bolometer and the bolometer manufacturing method of the present disclosure, it is possible to suppress a decrease in detection sensitivity.

What is claimed is:

1. A bolometer comprising:

a first electrode including a plurality of first extending portions having a plurality of first inner surfaces arranged in an arrangement direction, each of the first inner surfaces extending in an extension direction intersecting the arrangement direction;

a second electrode facing the first electrode while being separated from the first electrode in the extension direction; and a sensor including a sensor film and a connection portion, wherein the first electrode, the sensor film, and the second electrode are arranged in order in the extension direction, the connection portion extends in the extension direction, is provided between the plurality of first inner surfaces, and electrically connects the plurality of first inner surfaces and the sensor film, and the sensor includes carbon nanotubes.

2. The bolometer according to claim 1, wherein the second electrode includes a plurality of second extending portions having a plurality of second inner surfaces arranged in the arrangement direction, each of the second inner surfaces extend in the extension direction.

3. The bolometer according to claim 1, wherein, in the connection portion, the carbon nanotubes are oriented in the extension direction or bundled to be arranged in the extension direction.

4. The bolometer according to claim 1, further comprising a base electrode electrically connecting the plurality of first extending portions in the arrangement direction.

5. The bolometer according to claim 1, wherein the first electrode has a triangular wave shape or a rectangular wave shape.

6. The bolometer according to claim 1, wherein a thickness of the connection portion is greater than a thickness of the sensor film.

7. The bolometer according to claim 1, wherein an interval between the plurality of first extending portions is smaller than an interval between the first electrode and the second electrode.

8. The bolometer according to claim 1, wherein the carbon nanotubes include semiconductor-type carbon nanotubes.

9. A bolometer manufacturing method comprising:

forming a first electrode and a second electrode, the first electrode including a plurality of first extending portions having a plurality of first inner surfaces arranged in an arrangement direction, each of the first inner surfaces extending in an extension direction intersecting the arrangement direction, the second electrode facing the first electrode while being separated from the first electrode in the extension direction; and forming a sensor including a sensor film and a connection portion, wherein the first electrode, the sensor film, and the second electrode are arranged in order in the extension direction, the connection portion extends in the extension direction, is provided between the plurality of first inner surfaces, and electrically connects the plurality of first inner surfaces and the sensor film, and the sensor includes carbon nanotubes.

10. The bolometer manufacturing method according to claim 9, wherein the second electrode includes a plurality of second extending portions having a plurality of second inner surfaces arranged in the arrangement direction, each of the second inner surfaces extend in the extension direction.

11. The bolometer manufacturing method according to claim 9, wherein, in the connection portion, the carbon nanotubes are oriented in the extension direction or bundled to be arranged in the extension direction.

12. The bolometer manufacturing method according to claim 9, wherein a base electrode electrically connects the plurality of first extending portions in the arrangement direction.

13. The bolometer manufacturing method according to claim 9, wherein the first electrode has a triangular wave shape or a rectangular wave shape.

14. The bolometer manufacturing method according to claim 9, wherein a thickness of the connection portion is greater than a thickness of the sensor film.

15. The bolometer manufacturing method according to claim 9, wherein an interval between the plurality of first extending portions is smaller than an interval between the first electrode and the second electrode.

16. The bolometer manufacturing method according to claim 9, wherein the carbon nanotubes include semiconductor-type carbon nanotubes.

* * * * *